(12) United States Patent
Bourgeois

(10) Patent No.: US 7,498,504 B2
(45) Date of Patent: Mar. 3, 2009

(54) CELLULAR AUTOMATA MUSIC GENERATOR

(75) Inventor: Gary Bourgeois, Vancouver (CA)

(73) Assignee: Condition 30 Inc. (CA)

( * ) Notice: Subject to any disclaimer, the term of this patent is extended or adjusted under 35 U.S.C. 154(b) by 0 days.

(21) Appl. No.: 11/570,557

(22) PCT Filed: Jun. 14, 2005

(86) PCT No.: PCT/CA2005/000921

§ 371 (c)(1),
(2), (4) Date: Dec. 13, 2006

(87) PCT Pub. No.: WO2005/122138

PCT Pub. Date: Dec. 22, 2005

(65) Prior Publication Data

US 2008/0066609 A1    Mar. 20, 2008

Related U.S. Application Data

(60) Provisional application No. 60/578,838, filed on Jun. 14, 2004.

(51) Int. Cl.
*A63H 5/00* (2006.01)
*G04B 13/00* (2006.01)
*G10H 7/00* (2006.01)

(52) U.S. Cl. .......................................... 84/609; 84/645

(58) Field of Classification Search .................. 84/645, 84/609

See application file for complete search history.

(56) References Cited

U.S. PATENT DOCUMENTS

| 4,920,556 A | 4/1990 | Wong |
| 6,011,212 A | 1/2000 | Rigopulos et al. |
| 6,363,350 B1 | 3/2002 | Lafe |

OTHER PUBLICATIONS

Reiners, Paul, "Celllar Automata and Music," May 18, 2004, pp. 1-10.*
Miranda, Eduardo Reck, "CAMUS—A Cellular Automata Music Generator," Jul. 2002, pp. 1-6.*
Miranda, Eduardo Reck, "Chaosynth—A Cellular Automata Based Synthesizer," 2003, pp. 1-3.*

(Continued)

*Primary Examiner*—Jeffrey Donels
(74) *Attorney, Agent, or Firm*—Schwabe, Williamson & Wyatt

(57) ABSTRACT

The Cellular Automata Music Generator (CAMG) is a software platform, application and engine that generates and modifies musical compositions in real-time using a system of networked modules that utilize the 1-dimensional cellular automata (CA) mathematical model. The music compositions are non-looping (i.e. the same few bars of music do not repeat over and over), can be any length, can have low memory and processing requirements compared to looping WAV or MP3 files, and follow psychoacoustic principles. The music generated is ever evolving and can be globally altered based on one-parameter change. The music engine can be utilized in computer games or to generate unique ringtones or any musical composition for cell phones or other mobile devices based on ten-digit inputs, such as telephone numbers. The ringtones or musical pieces can be generated automatically based on the telephone number of the in-coming telephone call, or manually by the user, who inputs a selected numerical sequence. It can also be used as an audio caller identification system.

13 Claims, 16 Drawing Sheets

OTHER PUBLICATIONS

Millen, Dale. "An Interactive Cellular Automata Music Application in Cocoa," 2004.*

Ball, Philip, "Making Music by Numbers Online," Nature Magazine, 2004.*

Miranda, Eduardo Reck, "Introduction to Cellular Automata Music Research," 2003, pp. 1-5.*

Port, Otis, "Stephen Wolfram: Simple Solutions," BusinessWeek, Oct. 3, 2005.*

Cramer, Kathryn, "WolframTones," Sep. 9, 2005, pp. 1-18.*

"Cellular Automata in MIDI based Computer Music", Dave Burraston et al. *p. 4 Left Column.

* cited by examiner

ZenRings Composer Mode
(Tempo)

Figure 33

ZenRings Composer Mode
(Save As)

24
```
--------ZenRings--------
605-555-1212
Time: 00:00:00

Play
Tempo
Restart
Advanced
Save as Ringtone
Select         Exit
```

25/26
```
--------ZenRings--------
Save as Ringtone

Sets Phone with new
Ringtone and saves copy
in your ringtones folder.

Save Ringtone as:
🎤|
Save           Back
```

27
```
--------ZenRings--------
605-555-1212
Time: 00:00:00

Play
Tempo
Restart
Advanced
Save as Ringtone
Select         Exit
```

CELLULAR AUTOMATA MUSIC GENERATOR

FIELD OF THE INVENTION

The present invention relates to software for creating, defining, generating and modifying complex patterns and behaviors in computer-generated music content.

BACKGROUND OF THE INVENTION

Music composition and generation has been largely an artistic endeavor involving composers, musicians, recording engineers and the like to create melodies for pleasure or commercial use. Computer-generated music has been pursued in recent years for two reasons: academic curiosity and commercial demand for inexpensive, textural music for a variety of media applications including film, video, web sites, games and wireless applications. It is the latter reason that has economic implications, for a number of companies and consumers are looking for textural or ambient music that is inexpensive, easy to produce, as rights-free as possible and that follows essential psychoacoustic principles in composition. Computer music generation systems typically use MIDI (Musical Instrument Digital Interface) to control the electronic musical instruments.

Computer-generated music in real time has used a variety of systems or methodologies in an attempt to achieve these goals. Current systems, such as Sseyo's Koan system or the method as described in U.S. Patent Application Publication No. 20010025561 to Milburn use stochastic methods or metrics. Using the stochastic method, music is generated using random numbers to determine a variety of musical parameters within user specified constraints. The Koan system is an embodiment of this approach. The issues with the stochastic method are that the music may not be complex enough to adhere to the psychoacoustic principles that make the music sound as if it was composed and played by humans. In addition, this system can be difficult to use for those not conversant in music.

Milburn's approach to automatic music generation relies on pre-specified musical phrases, which are then analyzed using a metrics technique which allows the composer to morph between two different phrases. This technique requires a higher level of specification than the Cellular Automata Music Generator (CAMG) system described herein, in that the musical phrases must be pre-composed.

Another system used in music generation is the mathematical model cellular automata (CA). CA methodology lends itself to music generation because of the nature of this mathematical model. The CA theory stems from the notion that simple systems can generate complex behavior or patterns. This makes it ideal for music generation that requires complex output using simple and lightweight systems. In addition, CA systems are easy to modify on a global basis. Under a CA model, one parameter change can result in global dynamic behavior that is either predictable, complex, periodic or random. The system is also deterministic; therefore given the same parameters, the same musical piece will be generated and evolve in the same way each time, giving the user an element of necessary control.

There has also been work in music generation using CA, but it has been either using 2-dimensional models or applying simple 1-dimensional CA to a specific musical content, such as rhythm, to create simply a general beat or a series of notes. The issues with 2-dimensional models is that the systems are complex to use and have memory and processing requirements that are too high for average personal computer, wireless device or console systems. A number of authors have published related techniques to CAMG on the Internet (for example, Reiners, Millen, and Miranda). Reiner's system, named Automatous Monk, relies upon elementary 1D CA to generate musical parameters, however his currently published work is far more primitive in its application. For example, 1D CA are only used to generate pitch values for the composition, resulting in a far less complex final output.

Miranda's CAMUS is a generative music system in that it is based upon CA technology, but relies on complex 2D CA implementations. Milburn's approach to generative music employs a technique which creates a metric between two pre-composed musical phrases and allows the user to morph between them.

Sseyo's Koan uses purely random or stochastic techniques with constraints provided by the composer in areas such as which scale to use, and the range of note choices. Koan has a steep learning curve and requires the user to have musical knowledge. Koan is concentrated on the mobile and web site market.

Leach (U.S. Patent Application Publication No. 20030183065) employs a strictly rule based networking approach that does not use any CA based techniques Georges (U.S. Patent Application Publication No. 20030131715) employs a rule-based approach that does rely on stochastic variables. This approach is more closely related to Koan.

SUMMARY OF THE INVENTION

The CAMG is a software engine that allows users to create and modify an entire musical composition in real-time based on a selection of parameters. These compositions are non-looping (i.e. the same few bars of music do not repeat over and over), can be any length, can have low memory and processing requirements compared to looping WAV or MP3 files, and follow psychoacoustic principles. The innovative and unique aspect of this invention is the use of 1-dimensional CAs modules that are networked together to form an overall unifying framework to produce complex musical compositions. Once an initialization string is selected and implemented, the system does not require further human intervention to create a complex, fully developed piece of ever-evolving music. The initialization string can be any digital input including, but not restricted to, number sequences, game play sequences, real time MIDI input or previously composed MIDI files. CAMG uses MIDI to control the digital musical instruments for the compositions.

CAMG is built such that a single parameter change can have a global effect upon the entire composition. Unlike random systems, these changes can be controlled to produce the complex output required. In the case of CAMG, because of the CA methodology, a single parameter change, or just one byte of data, can have an effect on the flow of the entire piece of music. For example, this parameter change could be used to quickly or gradually change the density of the notes in the composition. A piece which is very 'chaotic and busy' would then evolve into a much more "repetitive and sparse" musical texture, or vice versa.

Due to the nature of CAs and the use of networked modules to control various aspects of the composition, such as scale selection, tempo, velocity, orchestration, timbre modification, rhythmic patterns, accompaniment and melody creation, CAMG has the following characteristics:

Fully interactive—Because the CAMG engine is generating music in real time, rather than playing back pre-composed music loops, the programmer can easily change the musical output in an interactive environment based upon user input.

Real time music generation—One key benefit of the CAMG engine is that the music it generates is composed in real-time, dispensing with the need to pre-arrange a number of different pre-composed MIDI or audio files, saving programmers for games or wireless applications from having to interface with numerous music cues.

Generates textural music—The primary content of the first version of CAMG is well suited toward creating music that serves a textural, ambient, background function often referred to incidental music.

Composer creates a process—The entire approach toward using CAMG is fundamentally different than the traditional model of music composition, where a composer relies on a number of different systems, such as MIDI sequencers, audio looping tools or digital audio workstations to provide a finished piece of music which the programmer must then integrate into a game or wireless application. In the CAMG model, the composer creates a process, which is then employed within the game or wireless application to generate the musical layer at runtime.

CAMG does the actual composition, saving valuable production time—In a traditional approach to music composition, where a composer has to pre-specify all aspects of the piece such as rhythm, melody and dynamics. CAMG allows composers to concentrate on the high level aspects of the musical content without having to specify the lower level details, such as choice of note value, rhythmic motif or dynamics. This shortens the composition cycle, saving production time.

Modifications simple and quick—CAMG uses algorithms which, based upon a single parameter, generate a variety of dynamic behaviors, including repetition, randomness and true complexity. This means modifications are simply parameter changes that require only a few keystrokes instead of recoding and re-recording audio files.

API is easy to use—Another inherent benefit of the CAMG engine is that the API layer is very easy to use. In many cases, all that the programmer has to specify is a bit string which determines the initial state of the CAMG. The CAMG itself then generates the music in real time based upon the initial bit string and subsequent modifications of the string to change the music in an interactive fashion.

Psychoacoustic principles embedded in algorithms, making music sound more realistic—Due to the nature of the algorithms that CAMG uses, human beings can inherently identify that the music being generated by the engine is not entirely random or overly predictable, depending upon the constraints that the composer chooses. Of course, CAMG does have the ability to produce music that is random or predictable if necessary.

Completely deterministic—CAMG generates musical output which is completely deterministic, unlike other more random music generation systems which typically derive their initial input using a random seed value, such as the current system time. This means that the music generated by CAMG will play exactly the same way every time given the same parameter inputs and initialization string.

Easily interfaced to other generative systems—Although CAMG is primarily designed to generate real time MIDI data, it can be easily adapted to interface with another generative music engine, such as Microsoft's Direct Music.

Can be used by non-musicians—Because CAMG does not use a traditional approach to music generation, non-musicians can quickly learn how to interact with the user interface to produce high level compositions, which can then be interactively guided or modified by the user in real time. A number of musically naive beta testers have reported that they found the experience of working with CAMG to be "very engaging" and "highly addictive" primarily because they get immediate feedback as they change the parameters of the composition.

Easily scalable to different levels of music generation—The CAMG engine can be employed to address any layer of music generation, such as parameter modification of the sound itself (using CAMG to determine the amount of vibrato in a note for example), direct generation of the music at the note level, re-arranging musical themes at the phrase level and finally re-arranging and re-orchestrating at the section (verse, chorus) level. CAMG can also be used as a real time mixer, to mute or solo individual instruments within the piece.

Generates arbitrary lengths of music—CAMG can be used to create essentially to create ever-evolving compositions, which can be synchronized with other digital content. For example, the music can change if a game player commits a series of moves or if a user performs a different task or function in a wireless application. In a wireless application example, the ringtone automatically changes with each telephone number received.

The underlying CAMG model could be extended to create more thematic, foreground musical content by allowing the composer to access the 'building blocks' which make up the engine itself, rather than relying on the user-interface to the pre-assembled initial CAMG engine. In other words, it is possible to broaden the CAMG's scope to produce a software development kit (SDK) for programmers to build their own engines for music.

A version of CAMG is also used to generate ringtones for mobile devices, such as cellular telephones. These musical compositions can be used as an audio caller identification system, a musical game or simply as a ringtone.

A method of real-time generation of music using networked 1-dimensional cellular automata and a number of other timing, selection and processing components is provided, including networking multiple cellular automata to generate various musical parameters to create and modify complex musical compositions. At the highest level, the CAMG uses a network of interconnected CA to generate all aspects of a musical composition. At the top of the hierarchical structure, a single 1-dimensional CA is used to determine the on-going arrangement of the composition by selectively updating a network of multiple 1-dimensional CA structures, or "virtual musicians", which determine the low level musical parameters for the composition, such as pitch, rhythm, velocity, duration, MIDI controller values, and arrangement. CAMG is scalable to include any arbitrary number of virtual musicians based upon the composer's input. The midlevel of the hierarchy is referred to as a "virtual musician" and consists of the individual self contained CA network which is responsible for actually creating the musical phrasing.

A method of generating rhythmic values using CA is provided, including a 1-dimensional CA is used to provide the rhythmic pattern for the real time creation of a musical phrase. Each active bit (value=1) in the CA corresponds to a single beat within a musical phrase. Each active bit also triggers other CA in the network to produce their associated parameter value, such as pitch, velocity and other controller parameters like volume or modulation. The generated pattern can be modified in a variety of ways by altering the delay values for the parallel delay line which provides the actual timing values of the rhythm. Each bit within the CA is associated with a variable length timing delay. If each delay is set to a time of 0 milliseconds, the rhythm output will consist of a chord that consists of as many notes as there are active bits in the CA (i.e. if the CA has 4 active bits then a 4 note chord will be generated). In a similar vein, a rhythm of single notes can be generated by assigning each timing delay to a fractional, cumulative value of the overall rhythm CA based upon the master rhythm update clock, which controls the rhythm CAs update status, divided by the lattice size of the CA (i.e. if the rhythm CA is being updated every 4000 milliseconds and its lattice size is set to 16 bits then each delay associated with each bit in the CA will have incremental values, starting at 0 milliseconds for the most significant bit (the first note in the musical phrase) and setting subsequent delays to incremental values of 250 milliseconds. (4000/16=250, delay values would increase in 250 millisecond increments from left to right: 0, 250, 500, 750 etc.)

A method of generating pitch values using CA is provided including using the decimal value of the CA to pick a particular note from a lookup table. In this instance the CA generates a note value between 0 and 127, which is then mapped to a lookup table which can constrain the note value into a particular scale or mode. A parameter associated with this function allows the CA generated value to be further constrained by introducing a 'slew' control which prevents the CA output from instantaneously generating its latest value. For example, assume the CA has generated a series of values; 23, 66, 44 based upon its transition rule and current state. Normally these values would be used to directly select the corresponding note value from the scale lookup table. The slew function limits the speed and step size for making the transition between the values. Using 23 as the staring value, and assuming the CA is being updated every 100 milliseconds; if the slew rate was set to 200 milliseconds and the step size to 1, the resulting CA value would be approximately 44 on the second update (halfway between 23 and 66). Essentially this function provides a continually varying output as opposed to the discrete value output that characterize CA. The bit position is used to select a note from a list of corresponding notes in a musical phrase. In this instance the CA which generates the rhythm pattern is also used to select a note value from a list of values which correspond to a single predetermined phrase of music. This approach associates each bit in the CA to a particular note value from the phrase. Using this approach allows the composer to specify an exact sequence of predetermined notes to be used for the generation of a musical phrase.

A method of generating velocity values using CA is provided including using a CA to generate a decimal value between 0 and 127 for the MIDI velocity of the associated note. The value generated by the CA is further constrained with a specified high and low value. A slew function is also provided to enable a continually varying value rather than the discrete values generated by the CA.

A method of generating generic MIDI controller data using CA is provided, including using a CA to generate a range a values which can be associated with an arbitrary 8 bit or 16 bit MIDI controller value, such as volume, modulation, and pitch bend. The value generated by the CA is further constrained with a specified high and low value. A slew function is also provided to enable a continually varying value rather than the discrete values generated by the CA.

A method of generating timing fluctuations using CA is provided, including using a CA to generate a decimal value between $-X$, $0$, $X$ number of milliseconds to offset the final timing value of the associated note. This function causes the note to be "behind or ahead" of the beat by a varying value. The value generated by the CA is further constrained within a specified high and low value. A slew function is also provided to enable a continually varying value rather than the discrete values generated by the CA.

A method of generating multiple musical parameters using bit fluctuations within the current CA state is provided, including relying upon the sequence of bits within the current CA state to generate a time varying continuous range of values which can be applied to most of the other low level parameters within the virtual musician. The CA generates a serial stream of bits which serve to alter the direction of a continuously changing value in a similar manner to the slew function mentioned above. The difference is that this technique employs the active bit to change the current direction of the values vector (i.e. a vector of values starting at a low value of 25 and incrementing to a high value of 66 at a rate of 20 milliseconds per step (25, 26, 27 . . . 66) would change the direction of the vector upon receiving an active bit from the serial bit stream being generated by the CA). Upon the occurrence of this active bit event, the continuous value would now start decrementing toward the low value of 25 and would continue decrementing until another active bit event causes the direction to change again.

A method of generating note duration values using CA is provided, including using a CA to generate a decimal value between 0 and X for determining the duration value of the associated note. The value generated by the CA is further constrained with a specified high and low value. A slew function is also provided to enable a continually varying value rather than the discrete values generated by the CA. A specialized "legato" module is provided to assist in generating duration values which are determined by the rhythm pattern generated by the rhythm CA. This function calculates the appropriate duration values associated with the active bits within the current CA state by examining the distance between the active bits. For example, in the case that the rhythm CA has generated a bit string "1000100010001000", with an update clock of 4000 milliseconds, this function would assign each active bit a value of 1000 milliseconds. In another case, a CA state of "1111111111111111" would assign each active bit a value of 250 milliseconds (4000/16). This value also has a constraint which allows the duration value to be shortened or lengthened (i.e. above examples could be 90 (staccato) or 1100 (legato with overlap) milliseconds). Note that the virtual musician must be capable of polyphonic output in the event of duration overlapping.

A method of generating phrase level musical arrangement using CA is provided, including using CA to determine the high level musical arrangement of the composition. This function uses 1-dimensional CA to control whether a particular virtual musician will play during the current phrase or not. At its simplest level, this function employs a CA to mute or unmute an individual virtual musician. More complex aspects of the arrangement can be determined by building a CA hierarchical structure which uses multiple, parallel CA to provide low level parameter initialization values, such as pitch and velocity to the virtual musicians structure. In this implementation, each virtual musician has an associated "master" CA, which is itself controlled by a "global CA".

A method of generating CA which have related evolutionary properties, including allowing for the automatic generation of related CA transition rules based upon the nature of the seed CA rule's evolutionary behavior. This function calculates related rules by simple manipulation of the binary expression of the transition rules unique number. For example, rule 255 (11111111) would become rule 0 (00000000) if each active bit in the rule table was inverted.

Both rules exhibit class 1 behavior. As a further example rule 30 (00111110) would become rule 86 (11100001).

A method of generating a unique musical composition based upon a user input phone number digit sequence is provided, including using CAMG to create a musical composition that is determined by the sequence of digits contained in a 10 digit phone number utilized as initial parameters for a subset of CAMG referred to as the "ring tone application". This embodiment of CAMG is intended to enable the user to generate a musical composition of indeterminate length based upon the input phone number. Each phone number will create a different piece resulting in a total of 10 billion different compositions.

A method of generating a real time telephone ring tone using the incoming phone number digit sequence is provided, including intercepting the incoming 10 digit phone number on a typical polyphonic ringtone enabled cellphone and to replace the default ringtones with a new musical composition that is unique for every possible phone number and is generated in real time. The resulting ring composition will play until the user's answering service feature is invoked, typically in the neighborhood of 10 to 20 seconds. Because each possible phone number input will have a different composition associated with it, the user will ultimately be able to distinguish the incoming caller by recognizing the composition that is generated

BRIEF DESCRIPTION OF THE DRAWINGS

FIG. 6 is an example of a representation of a range module according to the invention;

FIG. 7 is an example of a representation of a MIDI generator module according to the invention;

FIG. 8 is an example of a representation of a MIDI generator module for a drum/single note according to the invention;

FIG. 9 is an example of a representation of the values of a field generator module according to the invention;

FIG. 10 is an example of a representation of a lag generator module according to the invention;

FIG. 11 is an example of a representation of a serial lookup table module according to the invention;

FIG. 33 is a block diagram showing the composer mode and the save process in the ringtone application according to the invention.

DETAILED DESCRIPTION OF THE INVENTION

Definitions

Figure 1:
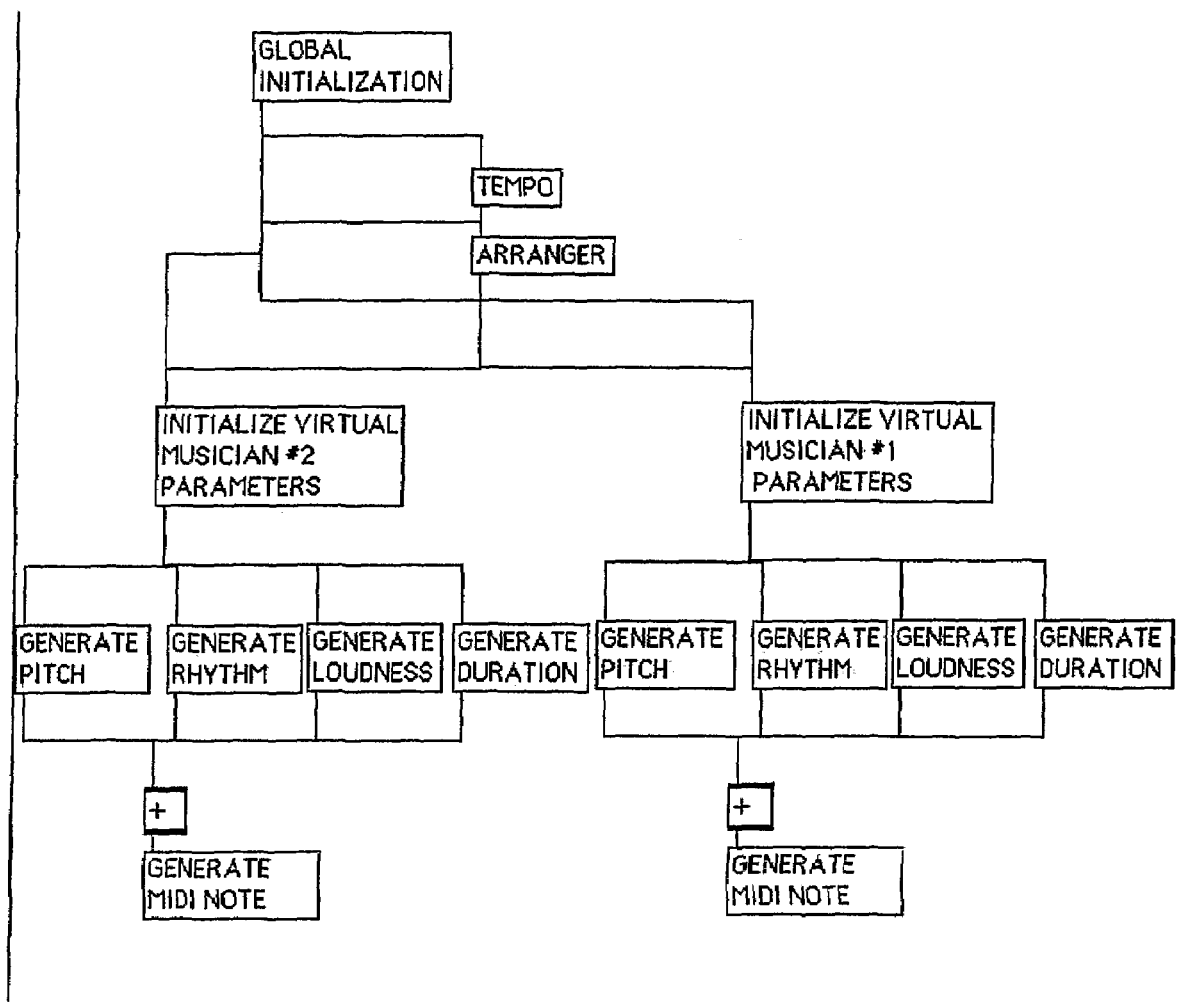
FIG. 1 is a block diagram of a CAMG according to the invention.

In this document, the following terms will have the following meanings:

C-Ionian, Dorian mode: Ionian mode refers to a type of musical scale consisting of eight notes. The white keys on a piano: C,D,E,F,G,A,B,C are the pitches used in this mode. The mode itself is based upon the intervals between each note in the following sequence, with a whole tone representing 2 steps and a semi tone, 1 step: 2,2,2,1,2,2,2,1. C Ionian means that the note sequence begins on the note C, D Ionian would begin on the note D and have the following pitch sequence: D,E,F#,G,A,B,C#,D.

Cellular Automata (CA): A mathematical model that employs computationally simple systems that can evolve into a series of patterns, some of which are inherently random or complex. Cellular automata are a simple model of parallel computation. The model comprises a matrix of cells, which can be turned on or off (e.g. black or white) and a transition rule. Based on the transition rule and the state of its neighboring cells, a cell will update its state (on/off) over time. It is the turning on and off of these cells that generate patterns over time.

Chromatic mode: A mode based on the chromatic scale. The chromatic scale divides an octave into twelve equal steps equivalent to the 12 keys within one octave of a piano keyboard.

Delay line: The delay line is used to delay an event trigger by a specified number of milliseconds. The delay line is central to the CAMG system for generating rhythm values.

Event Triggers: In CAMG, an event trigger refers to a signal which is usually generated by a clock or delay line that is used to update the CA receiving the event trigger to its next CA state. An event trigger can be though of as equivalent to the pulse of a timing source, such as a clock tick.

Fletcher-Munson curves: A series of curves that present the sensitivity of humans to various sound frequencies.

Legato: The smooth movement of one note to the next with no audible space or break between notes.

Melodic Range: This determines the lowest and highest note values for a particular instrument.

Metronomic Clock: A means of generating the exact tempo of a musical piece.

MIDI (Music Instrument Digital Interface): A standard method of interfacing computers and synthesizers developed in the early 1980's. MIDI is widely used throughout the audio and music production industry.

MS Offset: This component adds a continuously varying value expressed in milliseconds to the duration parameter. Used to provide a more organic, human feel to the rhythmic phrase.

Orchestration: Arranging a piece of music for an orchestra or band and the assignment of musical parts to different instruments.

One-dimensional Elementary (ID) Cellular Automata: This is the simplest network or matrix of cells. In this configuration, each cell has one of two possible states, on or off, and only two neighboring cells to affect its updates over time. The cells are arranged in a linear one-dimensional array.

Phrase Generator: The phrase generator associates a predetermined sequence of notes (a melody) with a particular index value, much like the serial lookup table but able to store multiple values with a single index.

Pitch: The property of a tone determined by its frequency or number of vibrations.

Psychoacoustic: Refers to the subjective way in which humans perceive sound, including music.

Serial Lookup Table: A serial lookup table associates a unique address location, or index with a particular numeric value. The size of the table determines how many addresses are contained within the table. The serial lookup table is used to constrain pitch values into particular musical scales.

Staccato: The opposite of legato, the notes are short in duration, regardless of the notes that follow in the rhythmic phrase.

Stochastic: Exhibiting varying degree of randomness.

Tempo: The speed at which a musical composition is played, measured in beats per minute.

Timbre: The sonic quality of a musical note. Different instruments and voices have distinctive qualities or timbres.

Transition Rule: The unique rule that defines how the cells will update over time. Each rule specifies how every cell in the CA will be updated based upon the current state of the cell in question and the state of it's left and right neighbors. There are 256 possible transition rules in the ID elementary CA employed in CAMG. Some rules, like rule 30 generate random patterns, whereas others, like rule 110, generate complex patterns.

Two-dimensional (2D) Cellular Automata: This is a more complex matrix of cells. In this configuration, each cell has eight neighboring cells in two dimensions to affect its updates over time.

Velocity (in reference to music): The loudness or softness of a note's volume.

VM Control: A Virtual Musician Controller, this component determines a variety of initialization parameters for the virtual musician section of CAMG.

WAV files: Utilizing a sound format developed by Microsoft, WAV files have CD sound quality.

Wolfram Classes: Stephen Wolfram, in the 1980's, discovered that 1 dimensional elementary CAs could be categorized into four classes that based on the types of patterns each transition rule generated. These categories include homogenous or constant state (Wolfram Class I), periodic limit cycles or repeating (Wolfram Class II), chaotic or random (Wolfram Class III) and finally true complexity (a mix of periodic and chaotic behavior—Wolfram Class IV).

ZenRings: Brand name for the ringtone or audio caller identification application.

Cellular Automata Music Generator Software—Component Modules

The following describes the various component modules of a CAMG according to a preferred embodiment of the invention. The end result of the modules is shown in FIG. 1 as the CAMG takes a global initialization and from that generates output of MIDI notes for a plurality of virtual musicians. The modules are preferably implemented by a computer having a memory, input and output means and a processor. In alternative embodiments of the invention not all of the modules need to be present.

Cellular Automata Generator (CAG or CA) Module

The CAG module is the central signal generation component of the CAMG. The core algorithm is a one dimensional elementary K=2, R=1 cellular automata with periodic boundary conditions. A preferred implementation has a variable lattice size of between 3 to 16 cells. The transition rule determines the future evolution of the CA based upon its current state. The 256 possible transition rules exhibit a variety of dynamic behaviors such as convergence to a homogenous state (Wolfram Class I), periodic limit cycles (Wolfram Class II), chaotic (Wolfram Class III) and finally true complexity (a mix of periodic and chaotic behavior—Wolfram Class IV). Wolfram classified the various CA behaviors as outlined in his book "Cellular Automata and Complexity".

The inputs to this module allow the user to set the lattice size, transition rule and initial state value. The initial state value must be less than or equal to 2 ^ Lattice size—1, (i.e. a size 3 lattice can only accept an initial state value in the range 0 . . . 7).

The Update Input causes the CA to advance to its next state based upon the current state value and transition rule.

The Output of the CAG module is a decimal number within the current lattice size range that corresponds to the binary value of the CA lattice.

Inputs:
Size: Lattice size of 1D CA (3-16)
Rule: Transition Rule (0-255)
Init: Initial state (0-65535 based upon lattice size)
Update: Update CA to next state Outputs:
State: Current CA state (0-65535)
Live Cells: Number of current cells equal to "1"

Figure 2:
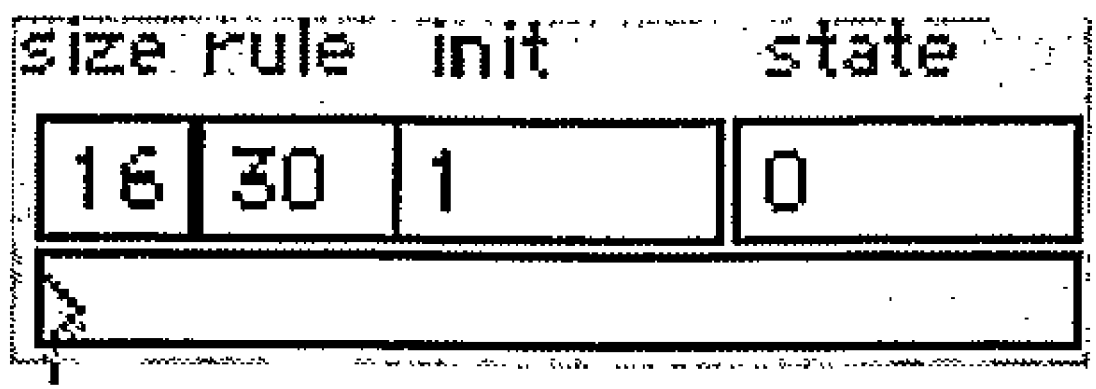
FIG. 2 is an example of a representation of a cellular automata generator module according to the invention.

A representation of a CAG module is shown in FIG. 2.

Serial/Parallel Delay (DLY) Module

Figure 3:
FIG. 3 is an example of a representation of a serial/parallel delay module according to the invention.

The DLY module is the primary timing and rhythmic component of the CAMG. The primary function of the DLY module is to accept a decimal CA state value as input and transform that value into a series of delayed event triggers based upon an internal lookup table. The process involves converting the decimal value into a binary value and using each bit to generate an event trigger that is subsequently passed through a series of parallel delay lines. Each bit in the binary value has a dedicated delay line. The user can input the global delay time, which is divided by the current size value to determine the delay time of each individual delay line. This value can be overridden by a Delay Lookup Table, which consists of different multiplicand values for the delay times. FIG. 3 shows a representation of a DLY module.

Figure 4:
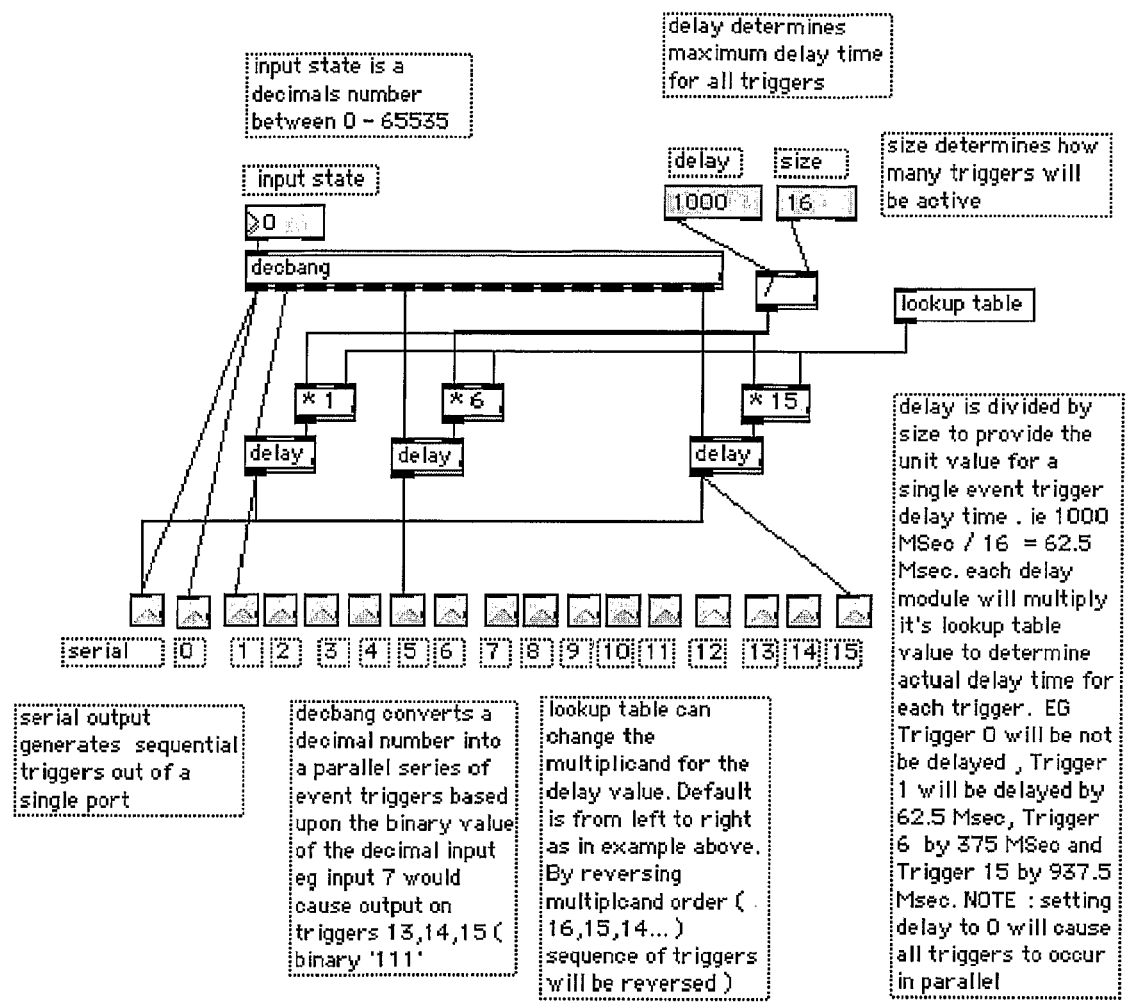
FIG. 4 is an example of a serial/parallel delay module with 16 event output triggers.

As seen in FIG. 4, the serial/parallel delay (DLY) module converts the CA state on input into a rhythmic phrase of a number of beats equal to the "size" parameter.

Figure 5:
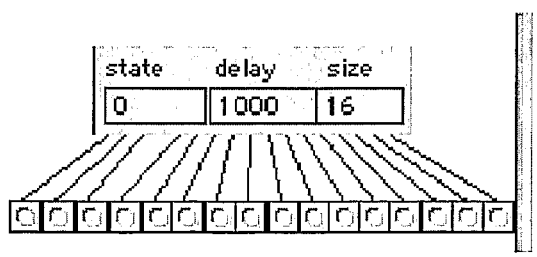
FIG. 5 is an example of the inputs thereof.

A Serial/Parallel Delay with 16 event output triggers is shown in FIG. 5. Note the left most event trigger (darker) represents the serial output.

Inputs:
State: Current CA state (0-65535)
Delay: Total delay time in Msec (divided by Size to determine cell delay time
Size: Range of input values (2 ^ N power) determines number of delay cells
Delay LookUp: Set current delay values to Delay Lookup Table values Outputs:
Serial Trigger: (red)
Parallel Trigger #1
Parallel Trigger #N (Size)

Range (RNG) Module

The RNG module is used to constrain the input state to a new user specified range of values. Example, an 8 bit CA will generate a value between 0-255. If the input state is 128, range "lo" value is set to 60 and range "hi" is set to 85, the new output value is 72. It is important that the size value is greater than the highest value for the input state (i.e. input of 235 would create an error if size was set to 7 bits, which has a maximum value of 127).

Figures 6, 7, 8, 9, 10, 11:
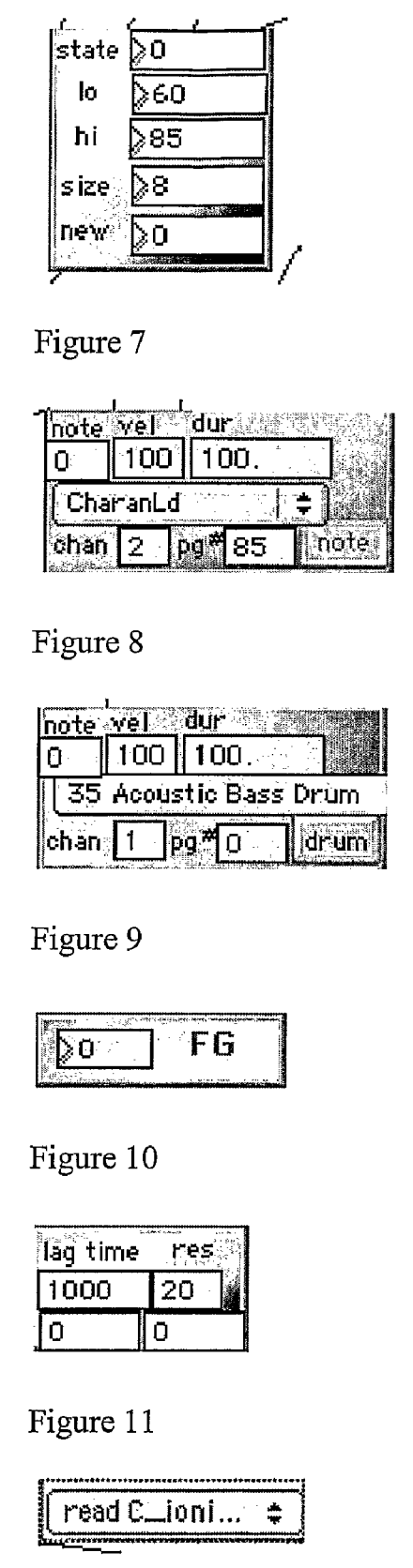

The RNG module is designed to restrict the range of notes that the CA can generate. For example, the parameters can be set to limit the CA to a range of a single octave to ensure that a bass line stays within a lower set of note values. The RNG module is also used to restrict the range of MIDI velocities or the loudness of a particular note. FIG. 6 shows a representation of a RNG module.

Inputs:
State: Current CA state (0-65535)
Range Lo: Minimum value for scaled range
Range Hi: Maximum value for scaled range
Size: Range of input values (2 ^ N power)

Outputs:
State: Current CA state scaled to RangeLo<=State<=RangeHi

MIDI Generator (MIDI) Module

The MIDI module is the primary MIDI playback engine in the CAMG. All input parameters can be replaced with CA generated values.

Inputs:
Note In: MIDI Note # (0-127)(pitch value)
Trig In: Trigger a note (play the note)
Velocity: MIDI velocity value (0-127) (loudness)
MIDI Ch: MIDI channel (0-16) (which instrument)
Duration: Duration in Msec (duration of note)
Pg Chg: MIDI Program change (0-127) (change instrument)

Outputs:
MIDI Note to MIDI port (sends Note On MIDI message to synthesizer)

FIG. 7 shows a representation of a MIDI module. A drum/single note version of the MIDI module is shown in FIG. 8.

Field Generator (FG) Module

The FG module is a simple binary to decimal converter that accepts event triggers as input bit values. One common application is to use multiple field generators to derive a number of different decimal values from a single CA binary state output.

Example: CA state input value is 29 (binary value is 11101) a 3 bit field generator attached to bits 1-3 would output 5 (101), a 2 bit field generator attached to bits 4, 5 would output 3 (11) and a 5 bit field generator would output 29. The Most Significant Bit (MSB) is the leftmost bit within the binary value. The Least Significant Bit (LSB) is the rightmost value.

The FG module can be used to generate initialization values for multiple modules from a single CA output. For example the output of a 16 bit CA could be divided into 4 equal sections of 4 bits each, which could then be used to provide an initial state value, between 0 and 16 for 4 other CA's that are used to generate pitch values.

Inputs:
Bit #12: MSB of a 12 bit number (bit 12)
Bit #N: Bits 11 through 2
Bit #1: LSB of a 12 bit number (bit 1)
Reset: reset all bits to 0

Outputs:
DecValue: Decimal value of 12 bit input state

FIG. 9 shows a sample representation of a FG module.

Lag Generator (LAG) Module

The LAG module provides a ramp function between successive input values. Lag time determines how much delta time will elapse between new input state and previous input state. Lag resolution determines how fine each lag increment will be. Once the new value has been reached the Reflected value output will begin counting in the reverse direction until reaching the previous value and then reversing again. The Limited output option will remain at the new value until a newer value is received.

Example: state value on previous input was 200, new value is 300. If lag time is set to 1000 Msec, the output value will ramp from 200 to 300 over a period of 1 Sec. If lag resolution is set to 1, lag sequence will be 200,201,202 . . . 300. If lag resolution is set to 20, lag sequence will be 200,220,240 . . . 300. Lag Value Reflected output will cause lag value to begin counting in opposite direction once new value is achieved, 220,240,260 . . . 300, 280, 260, . . . 200, 220

Limited output will cause lag value to remain at new value once new value is achieved, 220,240,260 . . . 300, 300, 300 . . .

The LAG module can be used to generate more "lyrical" melodies by preventing large jumps between notes. Most typical humanly composed melodies exhibit this characteristic.

Inputs:
State: Current CA state
Lag Time: Ramp value for lag time in Msec
Lag Resolution: Number of interpolation points between lag Values Outputs:
Lag Value—Reflected: Current lag value. If boundary value is Reached, lag reverses direction and continues.
Lag Value—Limited: Current lag value. If boundary value is Reached, lag remains at boundary value until a new input state occurs FIG. 10 shows a sample representation of a LAG module.

Serial Lookup Table (SLT) Module

The SLT module is used to provide a lookup table for constraining pitch values into particular scales. The input value is a decimal number between 0-127. The output value will be the lookup table value at the input value's address.

Example: input values 60, 61, 62 would output 60, 62, 62 if table was set to C-Ionian mode. Chromatic mode is a one to one mapping of input value to output value, 1-1, 2-2, 3-3 etc.

The SLT module is important for generating melodies which conform to a particular musical key. If the CA output was not constrained using the SLT module, the resulting melodies would sound much more random.

Inputs:
- CA State: current CA state (must be scaled to 0-127)
- Lookup Table: read lookup table Outputs:
- CA State: New CA state conformed to current lookup table FIG. 11 shows a sample representation of a SLT module.

Threshold/Counter (TCT) Module

The TCT module is used as a general purpose threshold trigger and counter. The module inputs can be either an event trigger or a CA state value. The event trigger input is used in counter mode to count the number of times an event trigger has been received as input. When the count has been reached the module generates an event trigger output. In threshold mode, the module uses the CA state value as input to determine whether it satisfies one of several logical evaluations, <,= or > and generates an event trigger based upon if the condition is satisfied. The inhibit/excite parameter determines whether the event trigger will only occur the first time the condition is true (inhibit) or every time (excite).

Inputs:
- CA State: Current CA state
- T/C Value: Threshold or Counter Maximum Value
- Trig In: Trigger input (advance counter)
- >, =, <: Comparison state (less than, equal, greater than)
- Inhibit/Excite: Excite—Trigger every time threshold is exceeded
  - Inhibit—Trigger only the first time threshold is exceeded
- Reset: Reset counter to 0

Outputs:
- Trigger:
- Count: Current counter value

Figure 12:
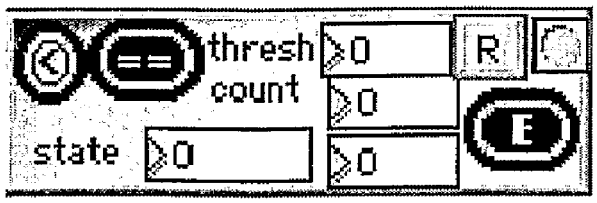
FIG. 12 is an example of a representation of a threshold/counter module according to the invention.

FIG. 12 shows a sample representation of a TCT module.

Clock (CLK) Module

The CLIK module provides a metronomic clock that outputs event triggers at a particular clock speed, set in Msec.

Figure 13:
FIG. 13 is an example of a representation of a clock module according to the invention.

Inputs:
- Start/Stop: Start or stop current clock (toggle)
- MSec: Clock value in Msec Outputs:
- Trig: Clock trigger (event trigger)
- MSec: Current clock value in Msec FIG. 13 shows a sample representation of a CLK module.

History (HIST) Module

The HIST module provides a history of previous CA states. Each time a new state is received, each state shifts to the right by one position and replaces the previous state in that position.

Inputs:
- CA State: Current CA state

Outputs:
- Current CA State
- Previous CA State (Time—1) (Bucket brigade)
- Previous CA State (Time—2)
- Previous CA State (Time—7)

Figure 14:
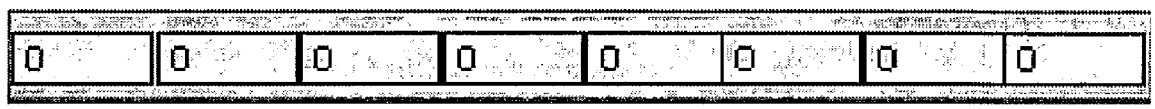
FIG. 14 is an example of a representation of a history module according to the invention.

FIG. 14 shows a sample representation of a HIST module.

MIDI Controller (CTRL) Module

The CTRL module provides a general purpose MIDI controller generator. Each of the 4 controller values can be set to a different MIDI controller # (i.e. CTL #7 is MIDI volume). The CA State value for each input is translated into the appropriate MIDI controller data on the MIDI channel set by the user. MIDI controllers are used to generate a variety of continuously varying values, such as instrument volume or pitch bend. This is useful for creating musical phrases which sound more organic and human.

Figure 15:
FIG. 15 is an example of a representation of a MIDI controller module according to the invention.

Inputs:
- CA State1: CA State (must be scaled to 0-127)
- CA State2
- CA State3
- CA State4
- CTL1: Midi Controller # (0-127)
- CTL2: Midi Controller # (0-127)
- CTL3: Midi Controller # (0-127)
- CTL4: Midi Controller # (0-127)
- MIDI CH: MIDI channel for controllers Outputs:
- CAState1 mapped to MIDI Controller # N value
- CAState2 mapped to MIDI Controller # N value
- CAState3 mapped to MIDI Controller # N value
- CAState4 mapped to MIDI Controller # N value FIG. 15 shows a sample representation of a CTRL module.

Phrase Event Duration (PED) Module

The PED module is used to calculate MIDI event duration times based upon the CA state used as input, combined with the current master clock value. The master clock value is used to calculate the overall duration of one 'bar' of 16 beats (equivalent to one CA state output of 16 cells). Internally this module divides the master clock value by 16 and multiplies each individual cell's value by an integer based upon the number of cells to the right of the current cell which have a state of 0 plus the current non zero cell value of 1.

Example: Assume CA input state is 65535: (1111111111111111) and current master clock value is 10000 Msec. Duration value for left most cell will be 10000/16=625 Msec. Because there are no cells with a value of 0, all durations for each of the 16 beats in the bar will be 625 (1*625).

Now assume input state is 34952 (1000100010001000). The leftmost cell will now have a duration value of 625*4=2500 Msec (i.e. current cell=1+3 "0" cells to the right=4). Note that all other non-zero cells will have the same value.

As a final example of a more complex input state, assume CA inputs state is 37090 (1001 0000 1110 0010), duration value for each non zero cell starting from the left will be: 1875 Msec (3*625), 3125 Msec (5*625), 625 Msec (1*625), 625 Msec, 2500 Msec (625*4) and 1250 Msec (625*2).

In musical terms, this module is responsible for determining the rhythmic value of each note in a phrase base upon the rhythmic position of the notes that follow. By varying this parameter, the articulation of the notes can be varied between legato to staccato.

Inputs:
- CA State: Current CA state
- MSec: Clock value in Msec
- Event Trigger #1: usually associated with Module 2-Serial Parallel Delay; Parallel Delay Trigger #1

Figure 16:
FIG. 16 is an example of a representation of a phrase event duration module according to the invention.

Event Trigger #N: usually associated with Module 2-Serial Parallel Delay; Parallel Delay Trigger #N Outputs:
Msec: Legato duration value associated with Event trigger position from Serial/Parallel Delay trigger FIG. 16 shows a sample representation of a PED module.

Complex Rules (CR) Module

The CR module uses a simple lookup table to constrain the possible CA transition rules to a subset of rules which exhibit complex, chaotic or periodic behaviors. Rules which tend to evolve into homogenous states are replaced by rules that exhibit more complex evolutions. (i.e. Rule 0 will always arrive at a homogenous state of "0000000" after one CA update, Rule 255 will always arrive at a homogenous state of "11111111" after one update). This module will output a new CA transition rule based upon the input rule's associated value in the lookup table (i.e. if input is Rule 0, output for new rule becomes Rule 30). The assignment of associated values is based upon a manually constructed look up table which has no underlying algorithm for generating the appropriate values.

Inputs:
Rule: Transition Rule (0-255)

Outputs:
Rule: Constrained Transition Rule (subset of 0-255)

Figure 17:
FIG. 17 is an example of a representation of a complex rules module according to the invention.

FIG. 17 shows a sample representation of a CR module.

Rule Matrix (RM) Module

The RM module calculates various transformations of the original transition rule used as input. The transformations consist of 3 variations of the input rule based upon the methods outlined in "The Global Dynamics of Cellular Automata", A. Wuensche ISBN 0-201-55740-1, pg 18-20, which is hereby incorporated by reference. The purpose of this module is to generate a group of related transition rules which have similar global behaviors.

A—Complemented Transition Rule: The complemented rule is the binary complement of the original (i.e. Rule 0 becomes Rule 255, Rule 193 (11000001) becomes Rule 110 (00111110).

B—Negated Transition Rule: The negated rule will generate a negative space time pattern (i.e. Rule 193 (11000001) becomes Rule 124 (01111100)).

C—Reflected Transition Rule: The reflected rule will generate a reflected (mirror image) space time pattern (i.e., Rule 193 (11000001) becomes Rule 137 (10001001)).

Inputs:
Rule: Transition Rule (0-255)

Outputs:
Rule: Original Transition Rule (0-255)
Rule: Complemented Transition Rule (0-255)
Rule: Negated Transition Rule (0-255)
Rule: Reflected Transition Rule (0-255))

Figure 18:
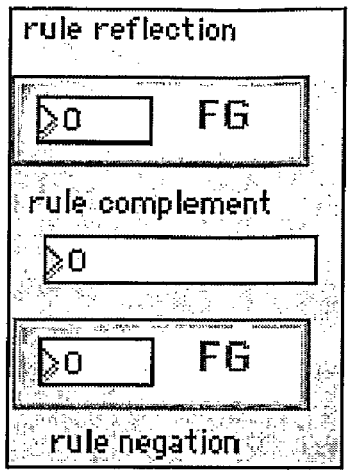
FIG. 18 is an example of a representation of a rule matrix module according to the invention.

FIG. 18 shows a sample representation of a RM module.

Global Initialization (GI) Module

The GI module performs the global initialization of the CAMG system. Every module contained within CAMG has associated initialization parameters such as CA transition rule, Serial/Parallel Delay time and Serial Lookup Table scale selection. The GI module effectively determines the entire initial state of the CAMG environment. The current global state of CAMG can be saved in order to perfectly replicate the musical composition being generated at that point in time. This module allows the user to create a specific "song" and recall that song at a later time. For example, CAMG may be initially configured to generate an "ambient techno piece" that the user wishes to save. The current song can be saved in the global initialization table and a different song such as a "chromatic fantasy" can be recalled.

Inputs:
Table of global initialization strings

Outputs:
All initial state parameters for every module within CAMG, such as Pitch CA size, transition rule and initial state.

Figure 19:
FIG. 19 is an example of a representation of a global initialization module according to the invention.

FIG. 19 shows a sample representation of a GI module.

Phone Initialization (Ringtone Application)(PINIT) Module

The PINIT module is a special purpose module that is not part of the general CAMG toolkit. It is specifically used to provide the global initial parameters for a ringtone application. Different digits within the phone number input are used to provide the initial values for every component within the ring tone application. For example the last digit of the phone number could provide the CA melody module #1 with an initial state setting of 7, the area code could provide the initial state for the CA rhythm module #2.

Inputs:
10 digit phone number: e.g. (604-555-5555)

Outputs: (all integer values except where noted)
CA Melody initialization: 4 digit value divided by 40 (0 to 250)
CA Duration init: 1 digit value (1 to 10)
CA Velocity init: 1 digit value (1 to 10)
CA Rhythm init: 4 digit value (0000 to 9999)
MIDI Program select: 2 digit value (00-99)
Scale select: 1 digit value (0-9)
Legato select: 2 digit floating point value (0.00-0.99)
Global Rule: 3 digit value (0-255)
Global Clock init: 4 digit value (6000-20000)
Melodic Range select: 1 digit value (0-9) See Appendix A Phrase Generator (PHGEN) Module This module is designed to generate pitch values based upon a look up table that associates a particular pitch with a corresponding active bit output by the Serial/Parallel Delay Module. Unlike the Serial Lookup Table, which constrains the CA state output of the CA used to generate pitch values, this module uses the parallel bit outputs from the delay module as its input. For example assume that the CA used as input has generated a CA state value of 65535 (1111111111111111), the Phrase Generator has been initialized with a phrase table consisting of the sequential series of pitch values: C3, D3, E3, F3, G3, A3, B3, C4, D4, E4, F4, G4, A4, B4, C5, D5. Because each bit in the input CA is active, the Phrase Generator would play an ascending C major scale of 16 notes beginning on C3. If the CA state value was 34952 (1000100010001000), the Phrase Generator would play a 4 note sequence consisting of the pitch values: C3, G3, D4, A4.

Figure 20:
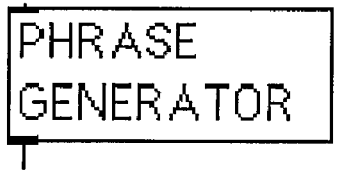
FIG. 20 is an example of a representation of phrase generator module according to the invention.

Inputs:
Parallel Trigger #1
Parallel Trigger #N (Size)
Select phrase table—choose which note values are associated with each bit Outputs:
MIDI pitch value (0-127)—Pitch value associated with a specific bit in
Serial/Parallel Delay Module FIG. 20 shows a sample representation of a PHGEN module.

1 Bit Controller (1BIT) Module

Figure 21:
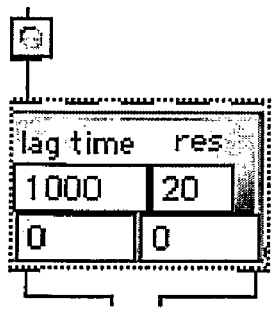
FIG. 21 is an example of a representation of a 1 bit controller module according to the invention.

The 1BIT module is used to generate a continuously varying value which can be applied to a variety of other module's inputs such as velocity, duration or MIDI continuous controller value. This module is related to the Lag Generator module in that its output continuously varies over time. The 1BIT module generates a serial stream of bits which serve to alter the direction of a continuously changing value in a similar manner to the Lag Generator Module described above. The difference is that this technique employs the active bit to change the current direction of the values vector (i.e. a vector of values starting at a low value 25 and incrementing to a high value of 66 at a rate of 20 milliseconds per step (25, 26, 27 . . . 66) would change the direction of the vector upon receiving an active bit from the serial bit stream being generated by the CA). Upon the occurrence of this active bit event, the continuous value would now start decrementing toward the low value of 25 and would continue decrementing until another active bit event causes the direction to change again Inputs:
  CA State1
  Lag Time: Ramp value for lag time in Msec
  Lag Resolution: Number of interpolation points between lag values
Outputs:
  Lag Value—Reflected: Current lag value. If boundary value is reached, lag reverses direction and continues
  Lag Value—Limited: Current lag value. If boundary value is reached, lag remains at boundary value until a new input state occurs FIG. 21 shows a sample representation of a 1BIT module.

Parameter Matrix (PM) Module

The PM module provides an alternative method of globally reconfiguring CAMG to create a network of CA and other modules that can be specified by the user. In this mode the user is able to select any combination of module inputs and outputs via a matrix which lists all possible input parameters on the X axis of the matrix and all possible output assignments on the Y axis. Using this module allows the composer to create customized configurations of CAMG for specific purposes other than the default CAMG structure.

Inputs:
  CA1 State input
  CA1 Size
  CA1 Transition rule
  DLY2 Delay time
  Lag Generator lag time
  (inputs for every module)
Outputs:
  CA1 state output
  CA2 state output
  (outputs of every module)

Figure 22:
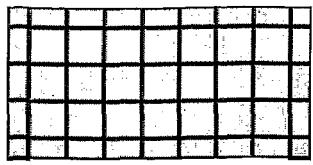
FIG. 22 is an example of a representation of a parameter matrix module according to the invention.

FIG. 22 shows a sample representation of a PM module.

Bit Shifter Module

This module is uses 2 CAG modules and 2 CLK modules to generate a random walk function. CA1 is used to implement the final output state of this module which generally consists of a binary number containing only one significant bit, such as 1, 2, 4 up to the lattice size as a power of 2. The module also outputs the bit number as a value based upon the bits position, i.e. binary 1 is position 1, binary 4 is position 3 and so forth.

CA2 provides the rate of change control, which determines which of the transition rules is applied to CA1. The rules that are used by CA1, 170, 240 and 204 are specifically selected to provide a left shift, right shift and identity function. The number of live cells contained in CA2 state provide the input value which determines which transition rule will be applied to CA1. The input threshold value determines when to apply each individual change of transition rule to CA1.

Inputs:
  CA1 Shift Size: Lattice size of 1D CA (3-16)
  CA1 Shift Init: Initial state (0-65535 based upon lattice size)
  CA2 Change Size: Lattice size of 1D CA (3-16)
  CA2 Change RuleRule: Transition Rule (0-255)
  CA2 Change Init: Initial state (0-65535 based upon lattice size)
  Clock value for Shift CA: controls rate at which output bit is generated
  Clock value for Change CA: controls how often Shift CA will change
  Start/Stop Clocks: Start or Stop the internal clocks
  Threshold Value: Determines when CA1 will change transition rule
Outputs:
  State: Current CA state (0-65535)
  Bit Number (0-16)

Figure 28:
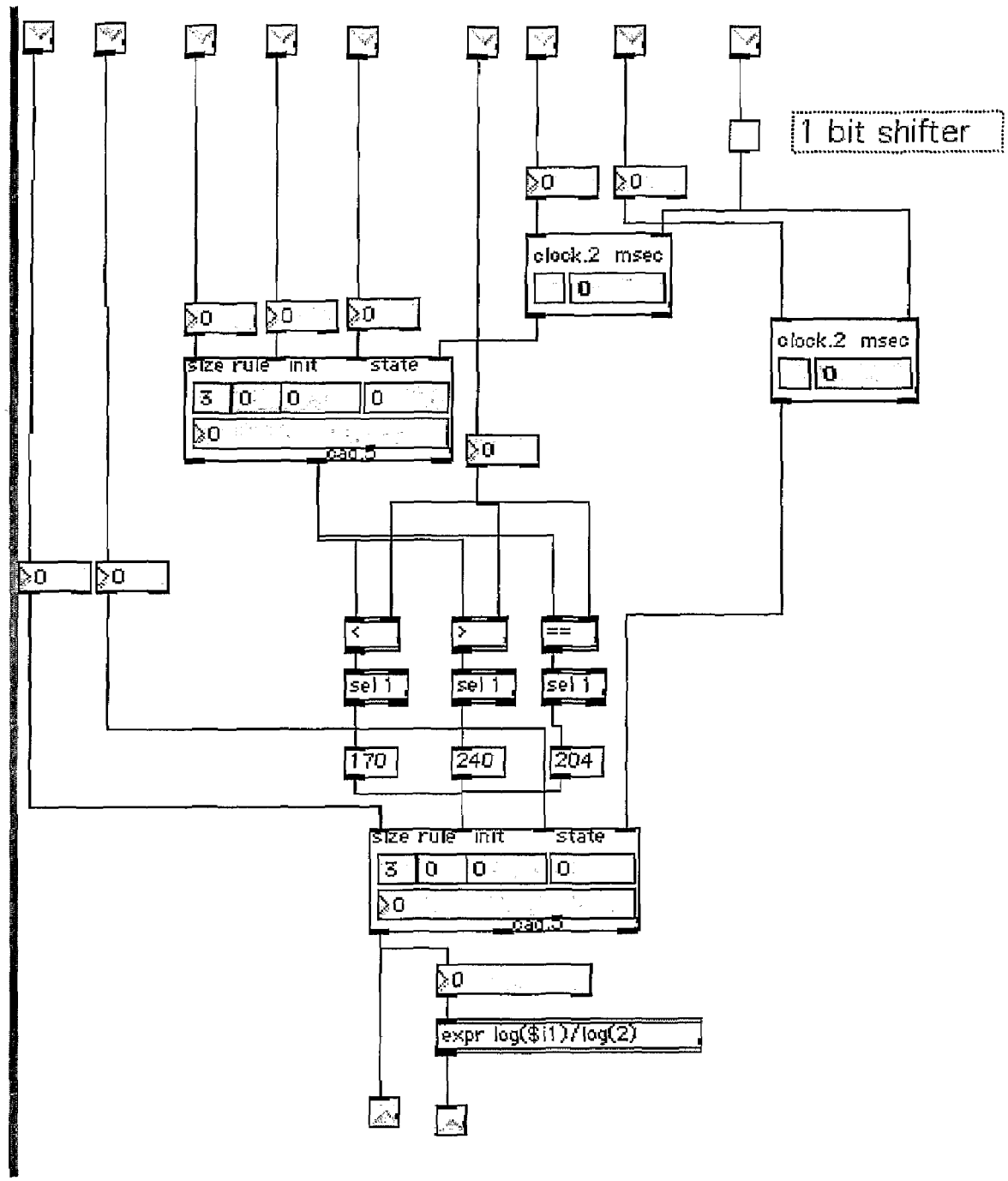
FIG. 28 is a representation of a 1 bit shifter module according to the invention.

FIG. 28 shows a representation of a bit shifter module.

Module Interconnections

Figure 23:
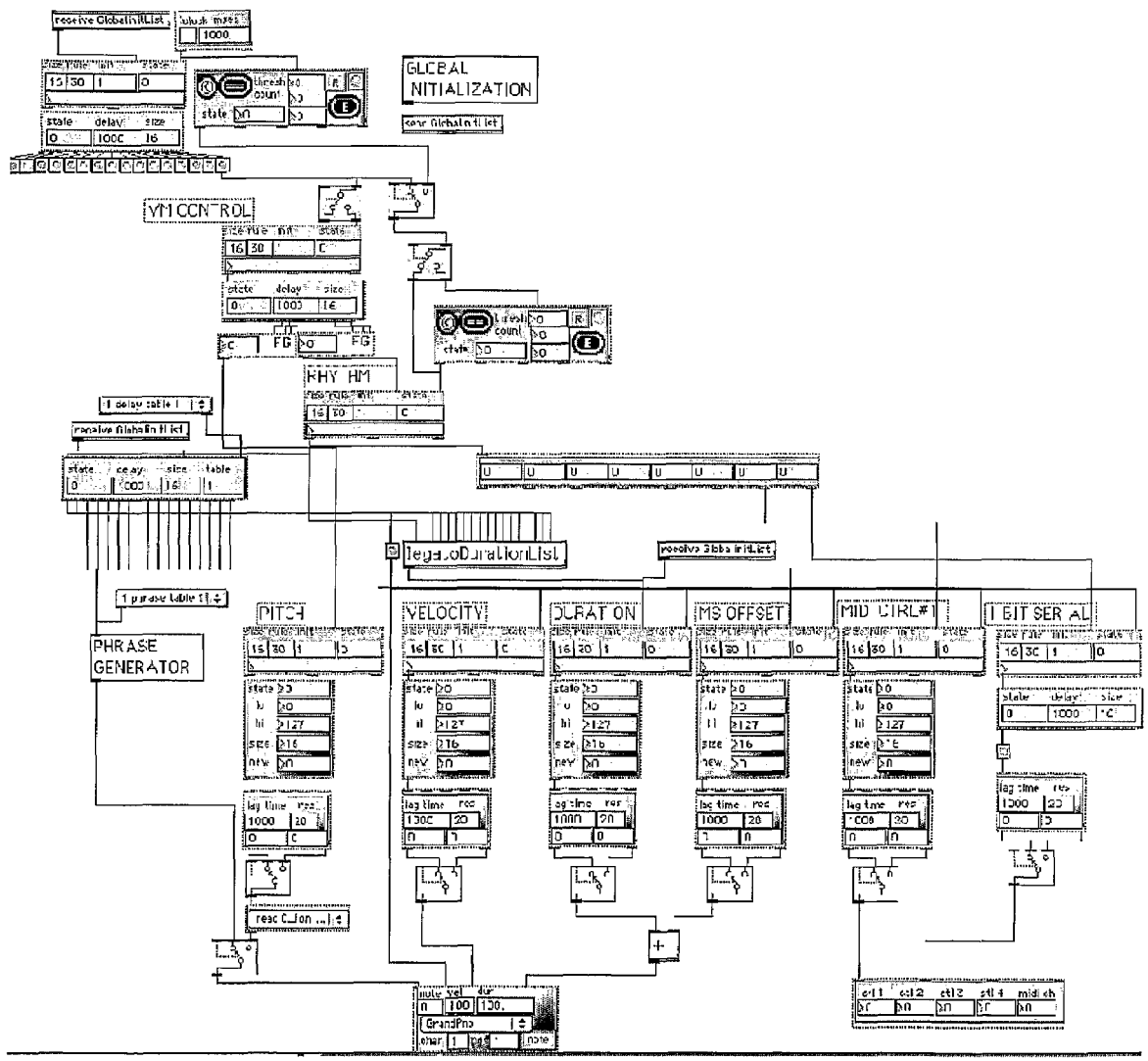
FIG. 23 is a representation of the CAMG module interconnections according to the invention.
Figure 24:
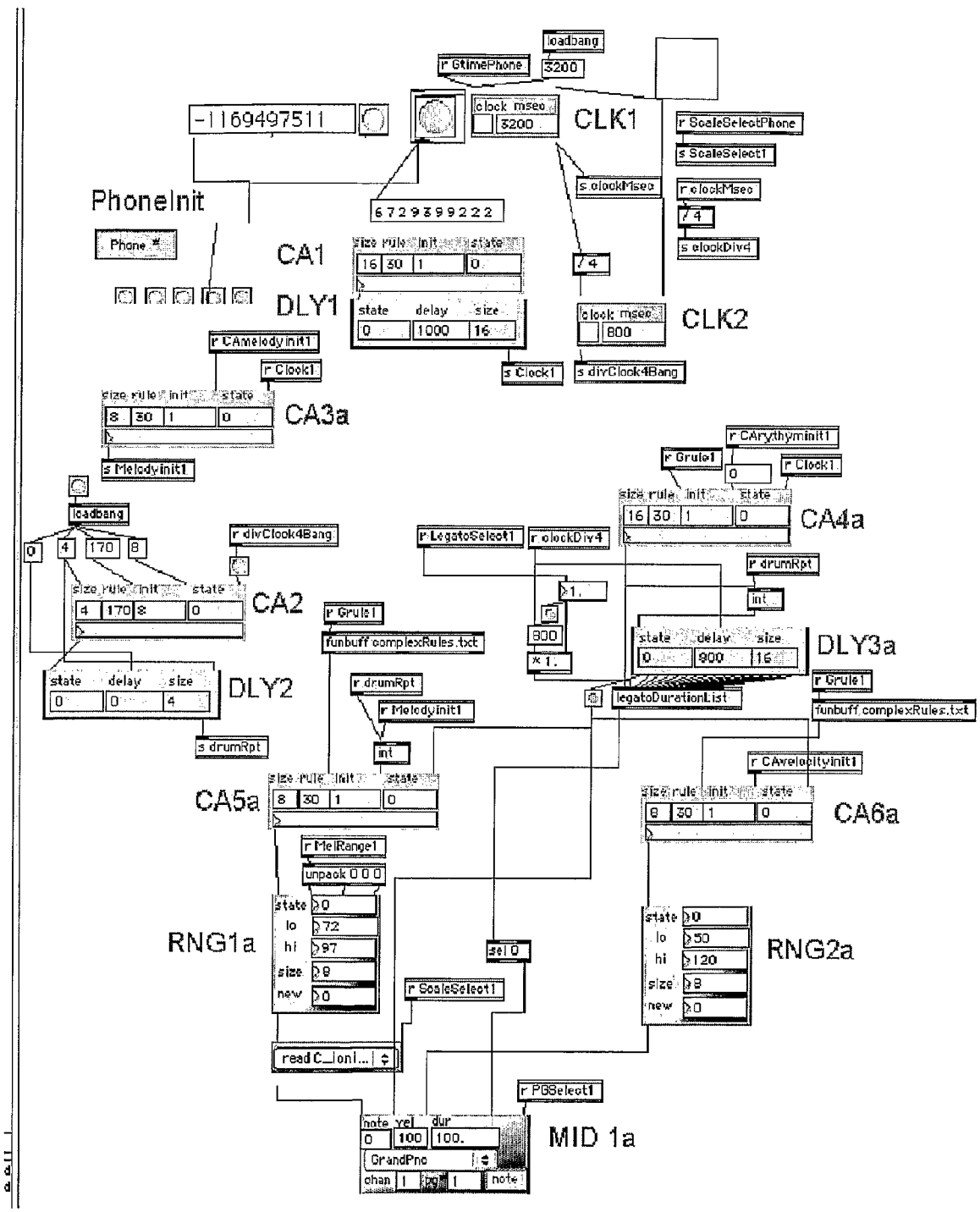
FIG. 24 is a representation of the CAMG module interconnections for a ringtone application according to the invention.
Figure 25:
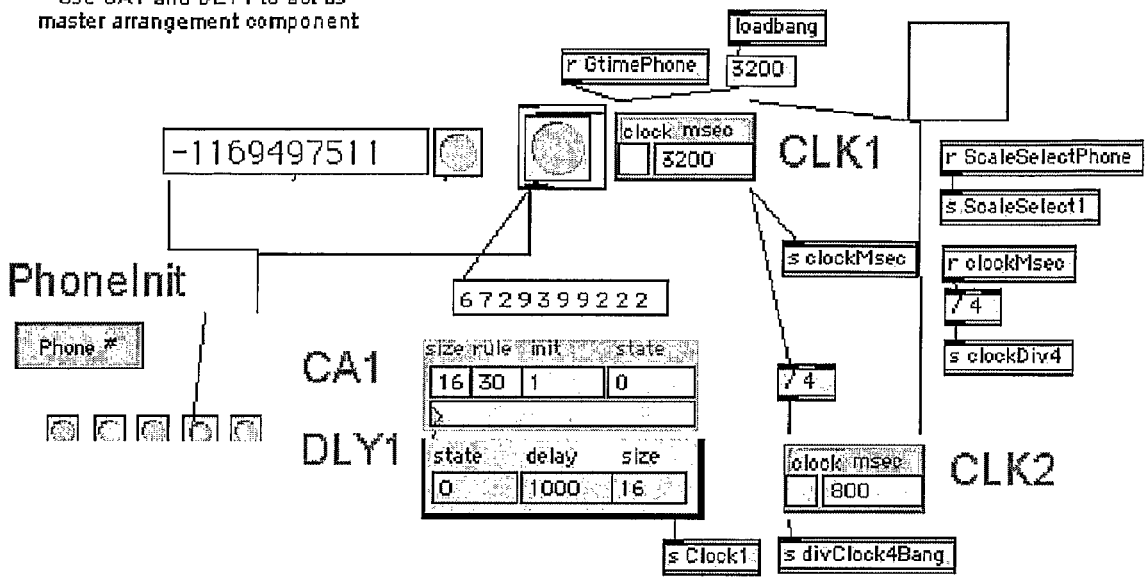
FIG. 25 is a representation of the initialization and master arrangement components thereof.
Figure 26:
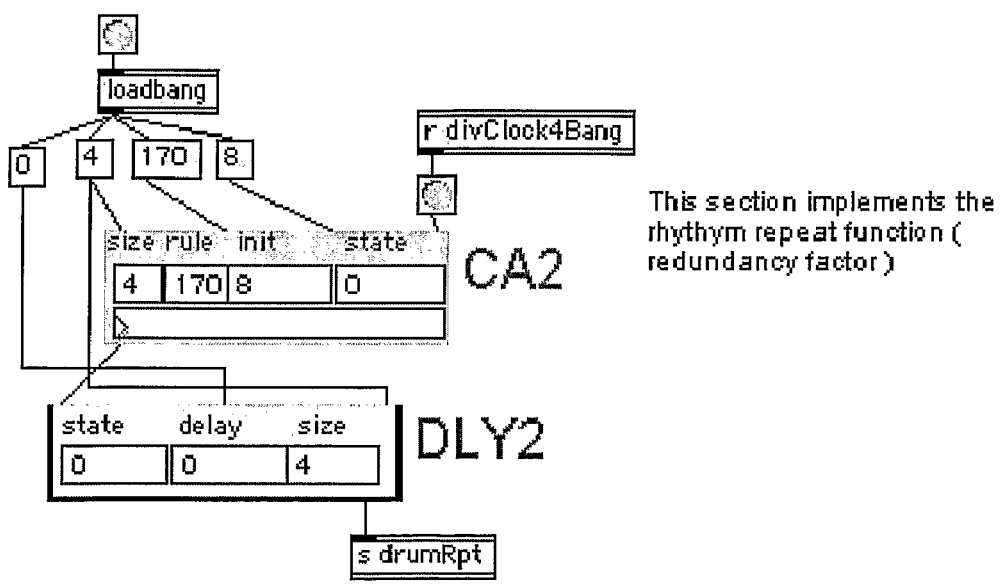
FIG. 26 is a representation of the rhythm repeat function thereof.
Figure 27:
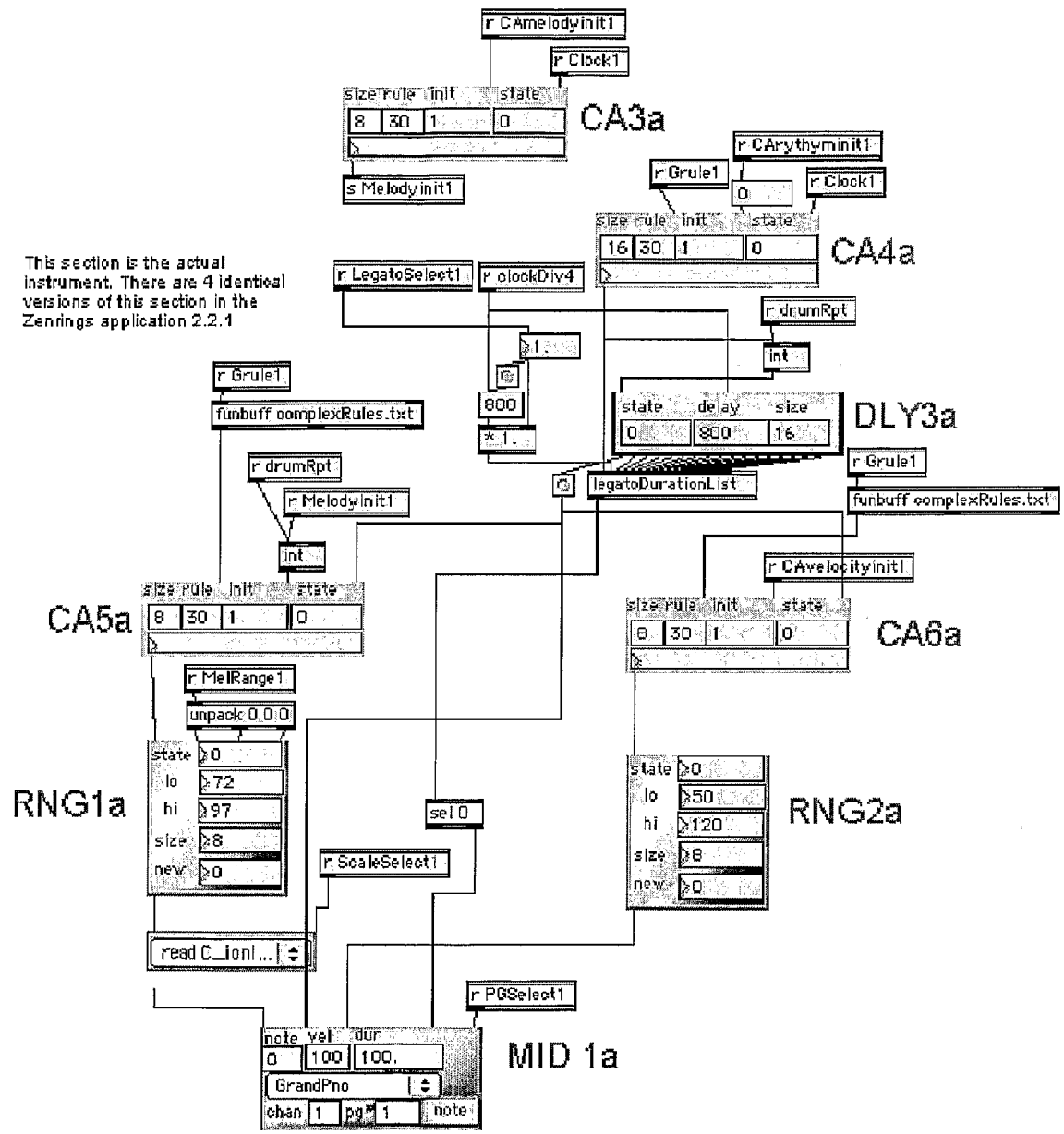
FIG. 27 is a representation of an actual instrument thereof.

The above described modules can be arranged to create a single virtual musician as shown in FIG. 23.

CAMG—Module Interconnections (Ringtone Application)

As shown in FIGS. 24, 25, 26 and 27, an application of CAMG may be designed to generate unique cell phone ring tones in real time, based upon the incoming phone number. When using this "ring mode", the length of the ring tone composition is determined by the cell phone's internal setting that determines the number of "rings" to generate before answering the call, or branching to the "leave message" feature. One variant of the application, "play mode", would allow the user to input the phone number manually and have the cell phone play the resulting composition for a more extended period, as determined by the listener.

Cellular automata are used extensively to provide the primary parameter generation within the "ringtone" composition. The initial input for the application consists of a 10 digit phone number (999-999-9999), which is used to determine all of the initial CA parameter settings for the music composition.

Unlike stochastic approaches to generative music, such as Sseyo's Koan, the CAMG methodology is completely deterministic, meaning that the composition based upon the unique phone number input will always "sound the same" and develop in exactly the same way over time.

CA Module Components:
  CA1 (Master Arranger—section 1) is used to provide the "master instrument arrangement" function. CA1 determines the input state for a delay module, DLY1. Each cell (bit) in CA1 is used to update the current state of CA4x, the "rhythm generator". Bit 16 is used to update CA4a, the lead instrument. Bits 15 and 14 update CA4b and CA4c, the harmony instruments and Bit 13 updates CA4d, the bass instrument.
  CA1 is updated by CLK1 (the master clock module) at a rate determined by the input phone number.
  The initial parameter settings for CA1 are size=16, rule=30 and init=1.
  CA2 (Rhythm Repeat—section 2) is used to implement a "rhythm repeat" function, which provides a degree of redundancy to the rhythms that each of the "instruments" used.

CA2 essentially acts a linear position counter based upon very specific initial CA parameter settings of size=4, rule=170 and init=8. Each update causes the current state to shift 1 cell to the right. By using an initial state setting of "8" (1000) with a lattice size of 4 bits, this CA causes a second delay module, DLY2 to trigger successive events that shift from right to left, starting at bit 13 output from DLY2, then shifting to bit 14, 15, 16, 13 . . . on each update clock.

The update clock is provided by clock module CLY2, which runs synchronously with master clock CLK1, but updates 4 times as often. (i.e. if master clock CLK1 is set to 3200 Msec, CLK2 will update every 800 Msec). Bit 13 of DLY2 is used to update CA7, which provides the "melody range setting". Bits 14-16 are used to provide the "drum repeat" function, which causes DLY3x (another delay module) to retrigger its current rhythm using the current state stored in DLY3x. Note that Bits 14-16 retrigger all DLY3x modules simultaneously, i.e. "drum repeat" is a global retrigger for ALL instruments.

CA3x (Melody Initialize—section 3) is used to provide an initial state value for CA5x, which provides the melodic values for MIDI Module MID1x. CA3x is initialized by a portion of the input phone number only at the start of the composition. CA3x is updated by the CA1/DLY1 modules. CA3a is updated by Bit 16 of DLY1. CA3b is updated by Bit 15 etc.

The initial parameter settings for CA3x are size=8, rule=30 and init is based upon phone number.

CA4x (Rhythm Generator—section 3) is used to provide the rhythm pattern for one "bar" of music consisting of 16 beats. CA4x provides the input for DLY3x which is further processed by Legato Module to provide the rhythmic sequencing and duration values for MID1x. DLY3 also provides the update trigger for CA5x (melody) and CA6x (velocity).

The initial parameter settings for CA4x are size=16, rule and init are based upon phone number.

CA5x (Melody Generator—section 3) is used to provide raw pitch values to RNG1x (a range module), which constrains the value to a range determined by CA7 (Melodic Range Setting). RNG1x is then filtered through Serial Lookup Table module to further constraint the final pitch value to a particular musical mode, such as Ionian or Dorian modes. The final pitch value is used to provide the "note" input for MID1x.

The initial parameter settings for CA5x are size=8, rule is based upon phone number and init is determined by the current output state of CA3x.

The phone number input for initialization is constrained by Complex Rules module to ensure that the transition rule used for melody generation is not a member of Wolfram's Class1 CA (Limit Points such as Rule 0, 255, 204 etc.).

NOTE: The phone number only determines the actual transition rule used by CA5a, the "Lead" instrument. The other instruments have transition rules which are determined by the Rule Matrix module as follows:

Harmony instrument 1 (CA5b) is the complement of the original rule, used by CA5a;
Harmony instrument 2 (CA5c) is the reflection of the original rule; and
Bass instrument (CA5d) is the negation of the original rule.
For example, if phone# selects Rule 193 for CA5a, CA5b uses rule 110, CA5c uses rule 137 and CA5d uses rule 124.

CA6x (Velocity Generator—section 3) is used to provide raw velocity values to RNG2x (a range module) which constrains the velocity to a new value based upon the Hi & Lo parameter settings of RNG2x. These RNG2x settings are not based upon the phone number, but instead are fixed for all possible compositions to a range of values which are loosely based upon psycho-acoustic principles pertaining to the human ear's frequency response pattern, i.e. the Fletcher Munson curves The initial parameter settings for CA6x are size=8, rule and init are based upon phone number.

The phone number input for initialization is constrained by Complex Rules module to ensure that the transition rule used for melody generation is not a member of Wolfram's Class1 CA (Limit Points such as Rule 0, 255, 204 etc.).

CA7 (Melodic Range Setting—section 4) is used to provide a list of parameters which select the Hi and Lo range values for RNG1a-RNG1d. Each RNG1x will receive a different range that determines the note values that a particular instrument will be able to use. For example, Instrument 4-"Bass" (RNG1d) has a range value of note #36 for LO and note #55 for HI (1.5 octaves) when melodic range is set to "C Ionian".

CA7 generates a value between 0 and 7 (000-111). The value generated by CA7 is then converted to a 3 bit binary value (via DLY4) and reconverted to decimal (via FG1). The output of FG1 is used to pick one of 8 "lists" which provide input for RNG1a-d CA7 is updated by bit 13 of CA2 (Rhythm Repeat)

The initial parameter settings for CA6x are size=3, rule=82 and init is based upon phone number.

NOTE: initial parameter is preset to be between the values of 1 through 6, a 0 or 7 input would cause 3 bit CA7 to enter a static state (always 000, 111 or alternating between these two states).

Rule 82 was chosen because any value between 1 and 6 will cycle through all states (other than 0 and 7). The cycle is a period 6. Increasing the size of CA7 would allow a greater number of possible values for the RNG1x parameter lists, beyond 6.

DLY4 and FG1 could be removed from this section and the output of CA7 could be directly input into the code that implements the actual list selection Ringtone Application Functions and User Interface Sequencing using Standard User Interface (UI) Components The examples below illustrate the sequencing to perform tasks for ZenRings in a ringtone application, such as audio caller ID. It uses standard UI components, however to make the UI more concrete. These use cases are based on the Series 60 phones: Symbian OS 7.0s although the CAMG can be adapted for use with other phone models.

Sequence 1: ZenRings Activation

Figure 29:
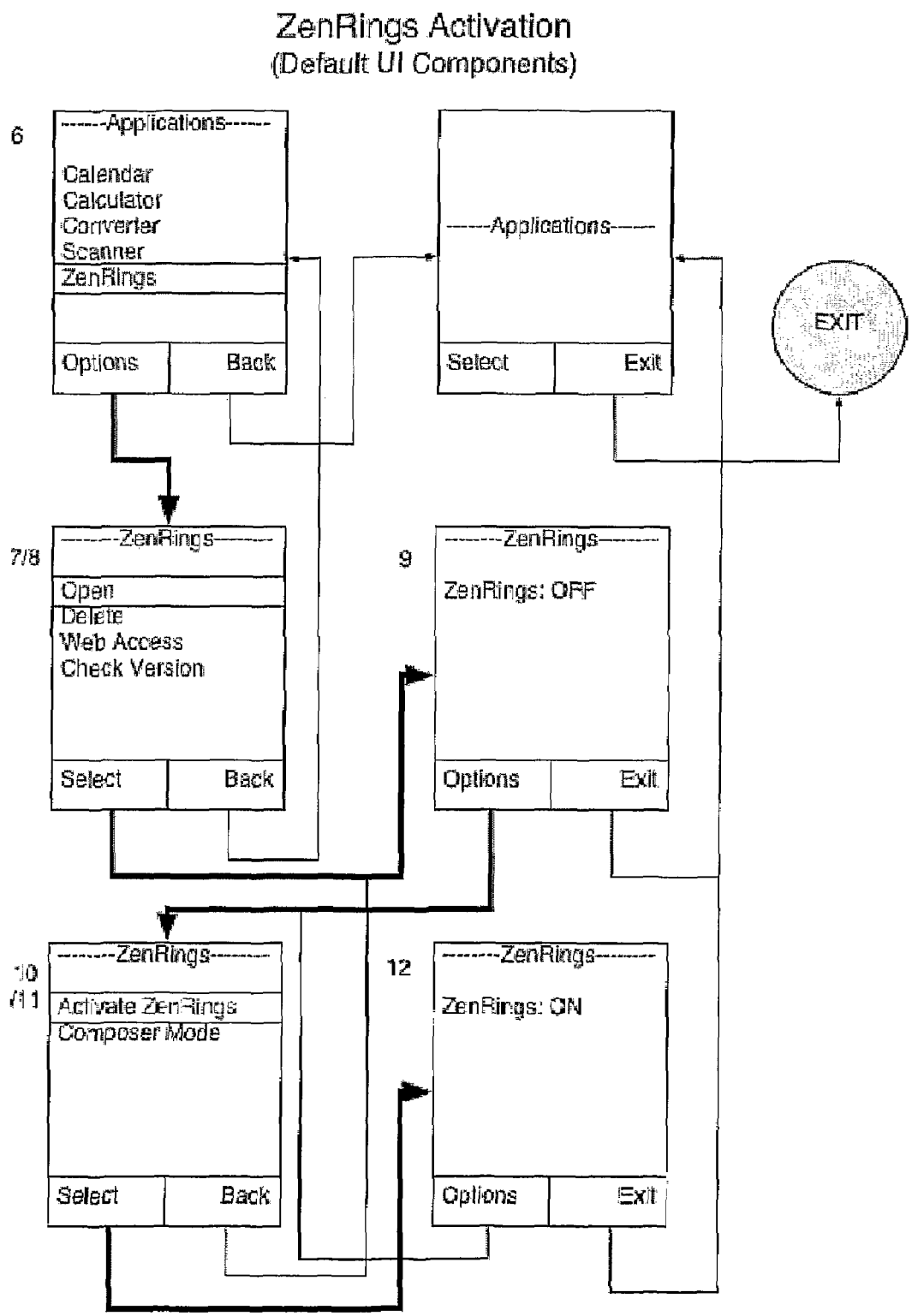
FIG. 29 is a block diagram of the activation process of the ringtone application according to the invention.
Figure 30:
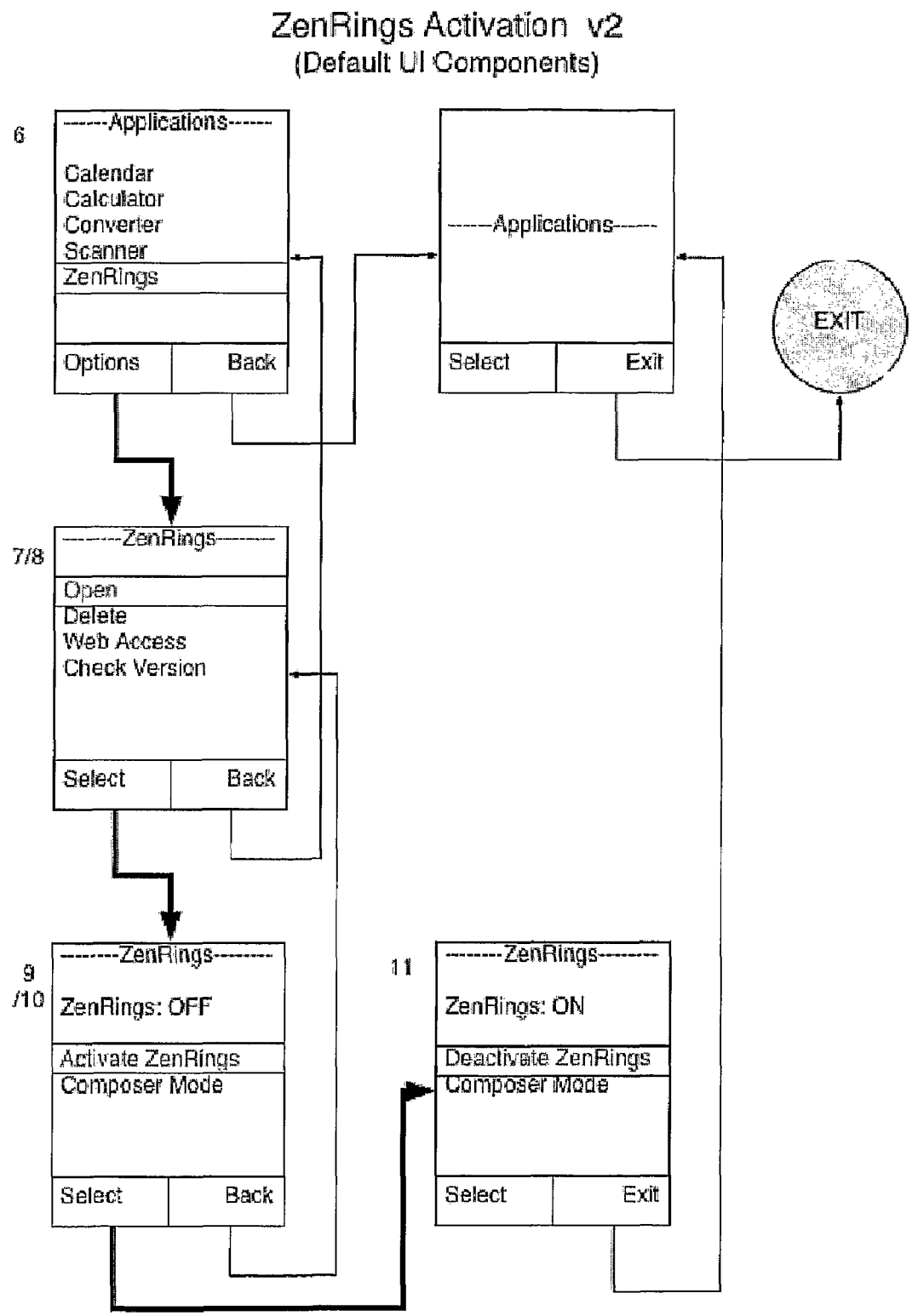
FIG. 30 is a block diagram of an alternative activation process of the ringtone application according to the invention.

As shown in FIGS. 29 and 30, the ringtone application (referred to as ZenRings) may be started using the following process:

| Trigger | Task | Sequence | Comments |
| --- | --- | --- | --- |
| Launch Program | Find ZenRings application on cell phone | 1. Activates "Menu" from default screen. 2. Uses arrows or joystick to cycle menu until "Applications" | 1. Activation may be pressing preset button or require another mode depending on phone. |

-continued

| Trigger | Task | Sequence | Comments |
|---|---|---|---|
| | | folder is highlighted.<br>3. Activates "Select" to open "Applications" folder.<br>4. Uses arrows to cycle menu until "Select Application" is highlighted.<br>5. Activates "Select" to get applications listing.<br>6. Uses arrows or joystick to cycle through available applications until "ZenRings" is highlighted. | 3. "Select" label may be "Open" depending on phone.<br>4. The $4^{th}$ step may be skipped on some phones. |
| Decides to abort plans to launch ZenRings* | Get back to default Phone Screen. | 1. Activates "Back" item available on the screen.<br>2. Repeats activating "Back" until default screen is reestablished. | 2. This process may be avoided on some phones by holding down "Disconnect" button on the cell phone. |
| Chooses to continue with Launching Program. | Enter ZenRings Interface. | 7. Activates "Options" to open list of application info: Open, Delete, Web Access, Check Version.<br>8. Uses arrows or joystick to cycle through available applications until "Open" is highlighted.<br>9. Activates "Select" to start ZenRings Interface. Status of Zen Rings Application is provided. It reads "ZenRings Status: Off". | 7. "Options" may not be universal for all phones. |
| Decides to Quit Application* | Get back to Default Screen | 1. Activates "Exit" available on the screen.<br>2. Activates "Back" item available on the screen.<br>3. Repeats activating "Back" until default screen is reestablished. | 1. Pressing "Disconnect" button does same function.<br>3. This process may be avoided on some phones by holding down "Disconnect" button on the cell phone. |
| Chooses to continue and activate Program. | Activate ZenRings program | 10. Activates "Options" available on the screen. Screen:<br>Activate ZenRings Composer Mode<br>11. Use Arrows or joystick to toggle between Start ZenRings and Composer Mode until Start ZenRings is selected.<br>12. Activates "Select" item available on the screen.<br>Screen pops up to the one displayed in step 8. It now displays: "ZenRings Status: On".<br>13. Activates "Exit" available on the screen.<br>14. Activates "Back" item available on the screen.<br>15. Repeats activating "Back" until default screen is reestablished. | 10. Composer Mode is a alternative Label to Play Mode. Although labels can change throughout development.<br>13. Pressing "Disconnect" button does same function.<br>14. This process may be avoided on some phones by holding down "Disconnect" button on the cell phone. |

*These triggers indicate possible aborting of the primary task, and do not represent a step in the required sequence to achieve the primary task. After a sequence is aborted, the user will need to begin a step one of the sequence.

Sequence 2: Composer Mode (See FIGS. 29, 30 and 31)

Figure 31:
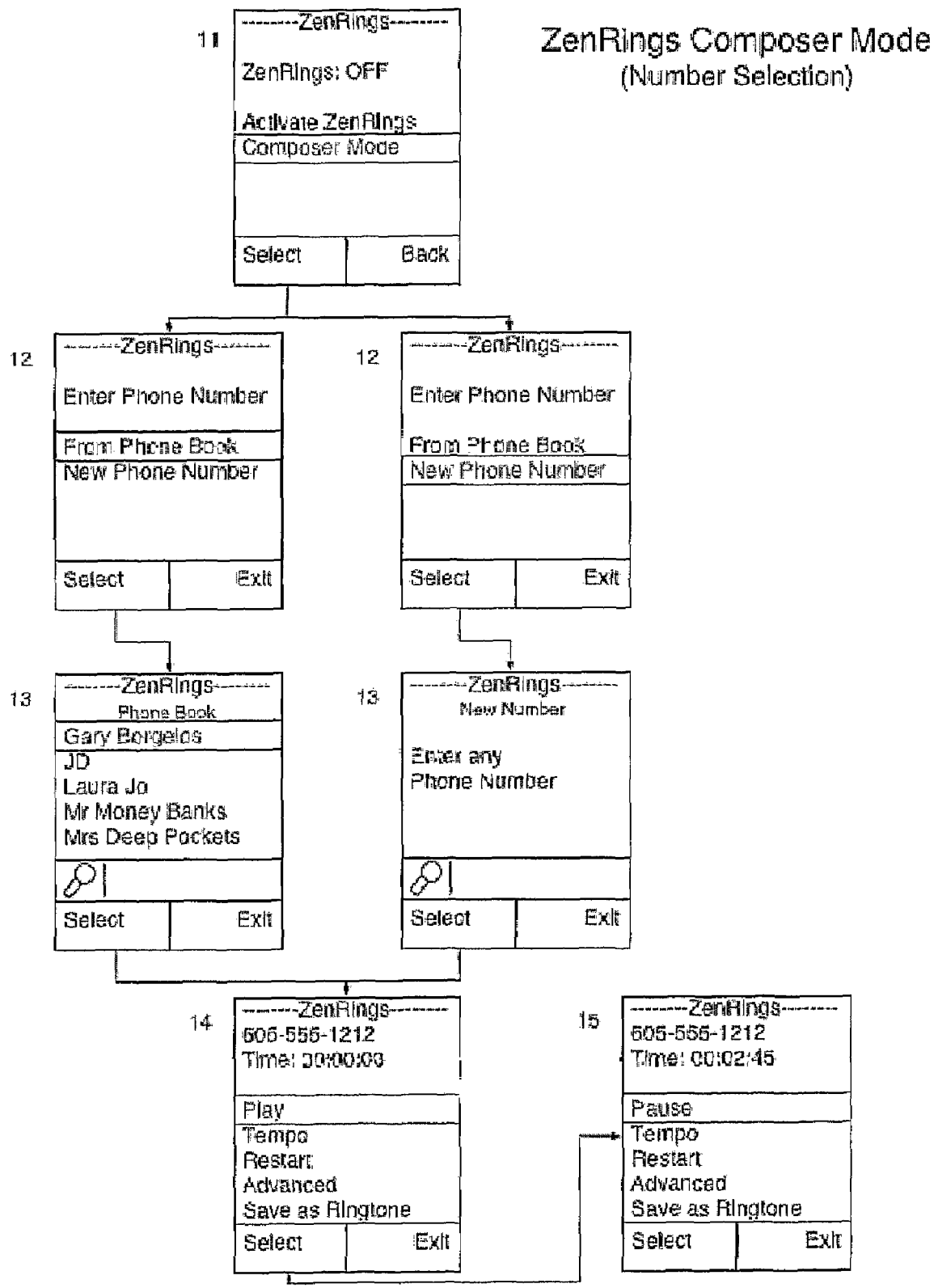
FIG. 31 is a block diagram of the composer mode and the number selection process in the ringtone application according to the invention.
Figure 32:
FIG. 32 is a block diagram showing the composer mode and the tempo selection process in the ringtone application according to the invention.
Figure 32:
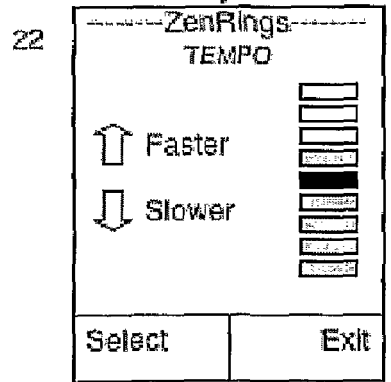
Figure 32:
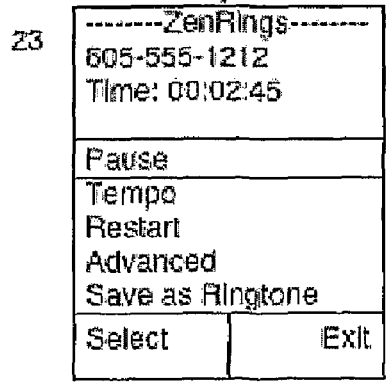

FIGS. 31, 32 and 33 show how the user can use the CAMG in a "composer mode" to save selected music and associate that music with a particular phone number, using the steps below:

| Trigger | Task | Sequence | Comments |
|---|---|---|---|
| Activate Composer Mode | Find ZenRings and enter interface. | Same as Sequence 1-9 The status of the ZenRings application may be ON or OFF | Sequence 1-9 may be set at the OS level. |
| | Activate/Enter Composer Mode | 10. Activates "Options" available on the screen.<br>Screen:<br>Activate ZenRings Composer Mode<br>11. Use Arrows or joystick to toggle between Start ZenRings and Composer Mode until Composer Mode is selected.<br>12. Activates "Select" item available on the screen.<br>Composer Mode UI is presented:<br>Enter Phone Number From Phone Book<br>New Phone Number | |
| | Chooses Number From Phone Book | 13. Use Arrows or joystick to toggle between "From Phone Book" and "New Phone Number" until "New Phone Number" is selected.<br>14. Activates "Select" item available on the screen.<br>Phone Book UI on screen.<br>15. Searches or Browses for stored phone number using default UI mechanisms.<br>16. Activates "Select" available on screen. | 16. Details and Back are the default UI mechanisms in the Phone book UI. It is preferable to use an instance of the phone book in order to have our own functionality within the familiar phone book UI. |
| | Plays Music | 17. New Menu Displayed:<br>604-555-1212<br>Play<br>Tempo<br>Restart<br>Advanced<br>Save as Ringtone<br>18. Uses Use arrows or joystick to cycle through menu until "Play" is highlighted.<br>19. Activates "Select" available on screen.<br>ZenRings Music Plays. | It may be useful to have a time indicator on screen, when the |

-continued

| Trigger | Task | Sequence | Comments |
|---|---|---|---|
| | | Menus Changes on Screen to now display: 604-555-1212 Pause Tempo Restart Advance Save as Ringtone | music is playing. |
| | Restart Music from Beginning | 20. User uses Arrows or joystick to cycle through until "Restart" is highlighted. | Screen does not change. Music restarts and Time Counter resets |
| | Changes Tempo | 21. User uses Arrows or joystick to cycle through until "Tempo" is highlighted. | |
| | | 22. Screen Changes to provide a meter. With present indicator being at midpoint. User uses arrows or joystick to adjust tempo. "Up" (or suitable icon) to Increase Tempo "Down" (or suitable icon) to decrease Tempo. | Music will begin or restart once Tempo is selected depending on play/pause status. Tempo changes in real-time as per user input. |
| | Chooses Tempo | 23. Activates "Select" Available on Screen. Screen is back to: 604-555-1212 Pause Tempo Restart Advance Save as Ringtone | Music remains Playing at new Tempo. |
| | Saves Ringtone | 24. User uses arrows or joystick to cycle through menu until "Save as Ringtone" is selected. 25. Activates "Select" Available on Screen. Screen displays: Save As: <Data Field> 26. User inputs name 27. Activates "Save" available on screen. Screen goes back to: 604-555-1212 Pause Tempo Restart Advance Save as Ringtone | New Ringtone for phone is set, and a copy of the Ringtone is sent to Ringtone folder with the saved. name. |
| | User Exits Application | 28. Activates "Back" available on the screen. Screen back to: Activate ZenRings Composer Mode 29. Activates "Back" Available on Screen. Screen back to: "ZenRings Status: On". 30. Activates "Exit" Screen Back to Applications Folder | |

Alternatively, it may be possible to provide restart function in the tempo window. Also it could be possible to adjust tempo, by using Left/Right arrows, keeping the Up/Down arrows reserved for menu navigation.

The above system is designed for use on a 176×208 display screen with 16 bit colour, although it could be adapted for use on other displays. It is also designed for use with the following inputs: two soft keys, five-way navigator, and several dedicated keys dependent on phone; although it could be easily adapted for other inputs.

Preferably the application is comfortably manageable in one hand using the user's thumb. This has important implications since it is convenient for users on the move. Since single applications fill the available screen, an application switcher is available via a long press of the menu button, which greatly enhances productivity on the device. Any user with mobile phone experience will grasp the workings of this intuitive UI very quickly.

Although the particular preferred embodiments of the invention have been disclosed in detail for illustrative purposes, it will be recognized that variations or modifications of the disclosed apparatus lie within the scope of the present invention. As an example the CAMG is useful in video games wherein actions by the game player provide the inputs to initialize the CAMG.

I claim:

1. A music generator for generating a music composition based on a digital input string, comprising:
a plurality of networked elementary 1-dimensional cellular automata,
wherein one of said cellular automata selectively updates the other cellular automata within said network;
wherein each of said cellular automata generates a value for a parameter for said composition;
wherein said networked cellular automata are initialized based on said input string; and
wherein said networked cellular automata generate a MIDI note for said composition.

2. The music generator of claim 1 wherein said input string is a telephone number.

3. The music generator of claim 2 wherein said music composition is a ringtone.

4. The music generator of claim 1 wherein said parameters for said composition including pitch, rhythm, velocity, duration, and MIDI controller value.

5. The music generator of claim 4 wherein a value for said rhythm parameter is generated by one of said plurality of cellular automata wherein each active bit in said rhythm cellular automata corresponds to a single beat within a musical phrase.

6. The music generator of claim 5 wherein a value for said pitch parameter is generated by one of said plurality of cellular automata wherein a decimal value of said pitch cellular automata is used to pick a note from a lookup table.

7. The music generator of claim 6 wherein a bit position of said rhythm cellular automata is used to select a note.

8. The music generator of claim 7 wherein a value for said velocity parameter is generated by one of said plurality of cellular automata wherein said velocity cellular automata generates a decimal value between 0 and 127 for said value for velocity of said note.

9. The music generator of claim 8 wherein said MIDI controller value is generated by one of said plurality of cellular automata wherein said MIDI controller cellular automata generates a range a values associated with said MIDI controller value.

10. The music generator of claim 9 wherein a timing fluctuation is generated by one of said plurality of cellular automata generating a decimal value representing a number of milliseconds to offset the timing fluctuation of said note.

11. The music generator of claim 10 wherein a value for said duration is generated using one of said plurality of cellular automata generating a decimal value for determining the duration value of said note.

12. A method of generating a ringtone associated with a phone number digit sequence, comprising the steps of:
 (a) receiving said phone number digit sequence from an incoming phone call;
 (b) initializing values for parameters of said ringtone based on said sequence; said parameters stored with a plurality of networked elementary 1-dimensional cellular automata; and
 (c) generating said ringtone using said initial values of parameters, and one of said plurality networked cellular automata to selectively update said values.

13. The method of claim 12 wherein said method generates an identical ringtone when an identical phone number digit sequence is received.

* * * * *